United States Patent
Miasnik

(10) Patent No.: US 8,632,338 B2
(45) Date of Patent: Jan. 21, 2014

(54) COMBAT TRAINING SYSTEM AND METHOD

(75) Inventor: Eli Miasnik, Kefar Sava (IL)

(73) Assignee: Israel Aircraft Industries Ltd., Lod (IL)

( * ) Notice: Subject to any disclaimer, the term of this patent is extended or adjusted under 35 U.S.C. 154(b) by 1180 days.

(21) Appl. No.: 12/282,990

(22) PCT Filed: Jan. 21, 2007

(86) PCT No.: PCT/IL2007/000076
§ 371 (c)(1),
(2), (4) Date: Sep. 15, 2008

(87) PCT Pub. No.: WO2007/105194
PCT Pub. Date: Sep. 20, 2007

(65) Prior Publication Data
US 2009/0081619 A1    Mar. 26, 2009

(30) Foreign Application Priority Data

Mar. 15, 2006 (IL) .......................................... 174327
Jul. 25, 2006 (IL) .......................................... 177080

(51) Int. Cl.
*F41G 3/26* (2006.01)

(52) U.S. Cl.
USPC ............................................ 434/21; 434/22

(58) Field of Classification Search
USPC ........ 434/11–27; 315/307; 345/1.1; 313/645; 702/158; 340/573.1; 398/108, 187
See application file for complete search history.

(56) References Cited

U.S. PATENT DOCUMENTS

| | | | |
|---|---|---|---|
| 5,227,985 A | 7/1993 | DeMenthon | |
| 5,247,128 A * | 9/1993 | Suzuki | ............................ 84/611 |
| 5,929,444 A | 7/1999 | Leichner | |
| 6,061,644 A | 5/2000 | Leis | |
| 6,142,784 A * | 11/2000 | Wood | ............................. 434/201 |
| 6,579,097 B1 | 6/2003 | Sampson et al. | |
| 6,801,637 B2 | 10/2004 | Voronka et al. | |
| 6,813,593 B1 | 11/2004 | Berger | |
| 7,683,548 B2 * | 3/2010 | Kupper et al. | ................. 313/635 |
| 2002/0064760 A1 * | 5/2002 | Lazecki et al. | ................... 434/11 |
| 2002/0101392 A1 * | 8/2002 | Hughes et al. | .................. 345/1.1 |
| 2004/0219491 A1 * | 11/2004 | Shlomo | ........................... 434/11 |
| 2007/0166669 A1 * | 7/2007 | Page | ................................ 434/21 |
| 2007/0194095 A1 * | 8/2007 | Brundage et al. | ............. 229/169 |

FOREIGN PATENT DOCUMENTS

| | | |
|---|---|---|
| DE | 34 05 017 A1 | 8/1985 |
| EP | 0 813 073 A2 | 12/1997 |

* cited by examiner

*Primary Examiner* — Timothy A Musselman
(74) *Attorney, Agent, or Firm* — Oliff & Berridge, PLC

(57) ABSTRACT

A target acquisition apparatus for use in association with a target, includes a weapon activation sensor, an image detector, a modulated light detector, a weapon processor, and a weapon transceiver for detecting activation of the weapon and producing a triggering signal. The weapon processor identifies a predetermined modulation characteristic from detected light radiation, identifies a predetermined spatial configuration within a predetermined portion of an acquired image, determines a local coordinate system, and produces a hit indication.

47 Claims, 19 Drawing Sheets

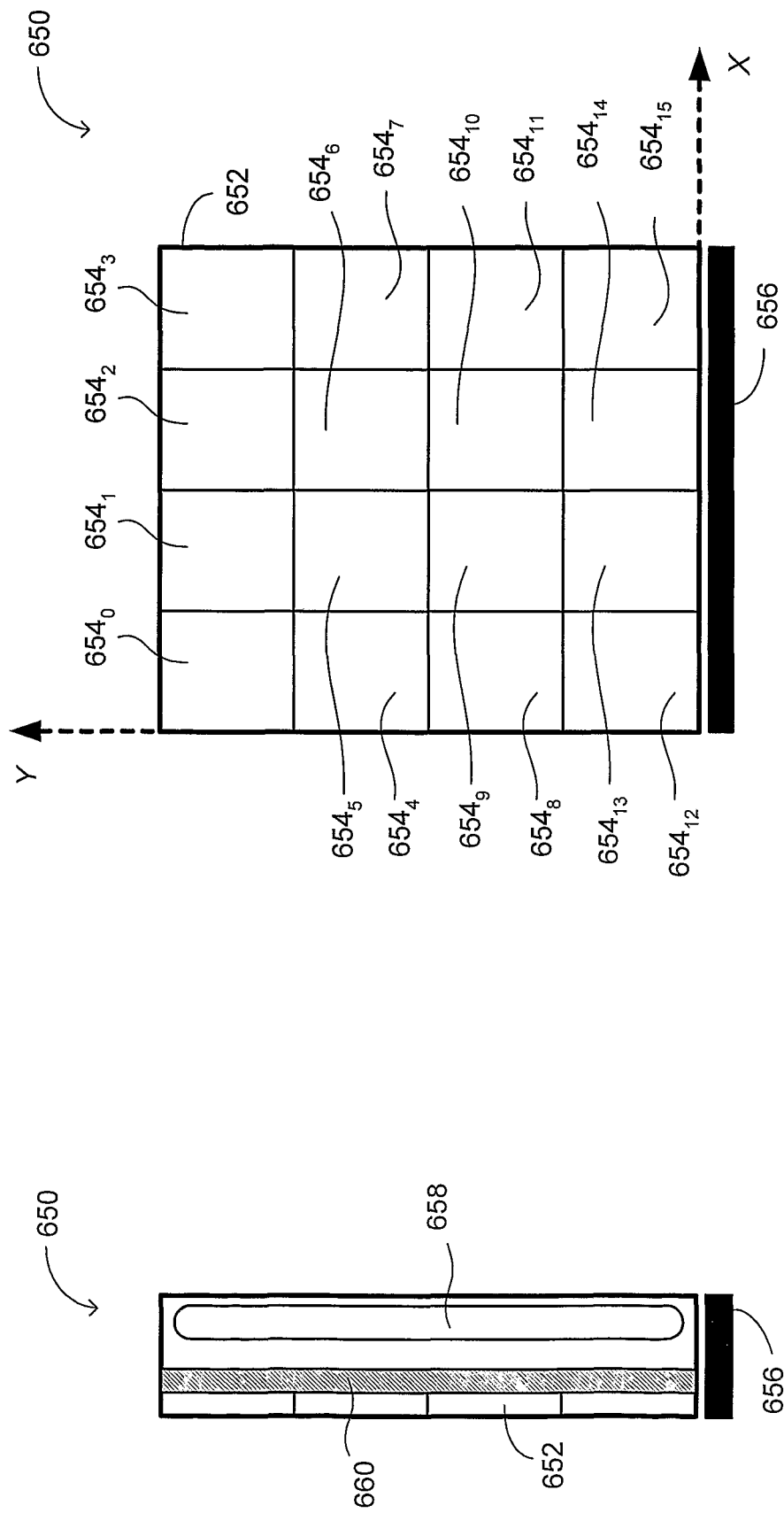

COMBAT TRAINING SYSTEM AND METHOD

FIELD OF THE DISCLOSED TECHNIQUE

The disclosed technique relates to combat simulators in general, and to methods and systems for simulating an armed combat in an urban setting, in particular.

BACKGROUND OF THE DISCLOSED TECHNIQUE

Systems for simulating combat for training are known in the art. Such systems provide participants with a simulated battlefield environment, employing simulated weapons. The participants of a simulated battle may include, for example, soldiers, vehicles, non-hostile pedestrians or animals. The participants train under simulated realistic battlefield conditions, without the detrimental consequences of sustaining casualties associated with conventional armed un-simulated combat. Such systems may include multiple integrated laser engagement system (MILES). In this type of system, the participants simulate shooting by actuating a laser transmitter, which simulate the potency of real projectiles. Additionally, the participants possess optical detectors, which detect the laser light impinging thereon; the system records each such detection as a hit. The laser beam transmitted by each participant is encoded with a unique Player Identification Code (PID), thereby identifying the shooter of every hit.

Another known combat simulation system is a paint-ball game system, wherein players of opposing teams target one another with paint-ball guns. Each player dresses in paint-protective wear, and possesses a paint-ball gun. A player from one team, holding paint-ball gun, launches balls that contain paint of a predetermined color representing the team of that player. The player launches that paint-ball toward a player from an opposing team. When the ball strikes the opposing team player, the paint present within the ball is released onto the paint-protective wear of that opposing team player, thereby visually marking that player as hit. Casualty assessment is confirmed visually, according to the color present on the paint-protective wear of the players.

U.S. Pat. No. 6,813,593 issued to Berger, and entitled "Electro-Optical, Out-Door Battle-Field Simulator Based on Image Processing", is directed to a system and method for simulating a battle using flashing infrared lamps and an infrared sensor. The system includes a weapon simulator and a plurality of targets. The weapon simulator includes an infrared sensor, an image processor and a transmitter. The infrared sensor is sensitive to infrared light as well as to visible light, such as a CCD television camera, and located within the seeker head of the weapon simulator. Each of the plurality of targets includes a flashing infrared lamp and a receiver.

A weapon operator aims the weapon simulator at a target, and locks onto that target. The transmitter of the weapon simulator transmits a signal to all targets, to activate the flashing infrared lamps, located on each target. Each infrared lamp flashes at a unique frequency, specific to the associated target. The CCD camera passes a sequence of acquired images of the target (including the respective infrared lamp), to the image processor, at predetermined time intervals. The image processor calculates the flashing frequency of the infrared lamp by comparing successive images. The image processor identifies the target by comparing the flashing frequency with a look-up table of target frequencies. The image processor further compares the acquired images of the target with another look-up table, containing data of the shape and size of each target, to estimate the aiming accuracy. The transmitters transmit another signal to deactivate the infrared lamps.

The transmitter transmits a signal in order to detonate a pyrotechnic charge located at the target, thereby releasing smoke, to simulate a "hit" of the weapon simulator. The pyrotechnic charge is detonated, such that the amount of smoke varies in accordance with the accuracy of aim, to provide a visual representation of that aiming accuracy. Information about the weapon simulator operator, the identity of "hit" target, and the accuracy of aim is transmitted to a simulation control center to update data stored there, and to enable trainers to control the training program and rate the launchers.

European Patent Application No. EP0813073 A2 to Greene, entitled "Object Identification and Precision Localization through Combined Video and Infrared Signals", is directed to a system for locating infrared identification tags using CCD video cameras. The system includes a plurality of infrared identification tags, a plurality of CCD video cameras and an image processing system. The infrared identification tags each emit distinctive modulated infrared signals, which are detected by the CCD video cameras. Each of the CCD video cameras acquires a sequence of images. The image processing system extracts the modulated infrared signals from the sequences of images. Each camera provides two dimensional images. The image processing system uses calibration information of the cameras, to merge the two dimensional information from each camera in order to derive a three dimensional position of the infrared tags. Stationary objects or slow moving individuals tagged with the infrared identification tags, are identified, located and tracked by the system.

U.S. Pat. No. 5,227,985 issued to DeMenthon, and entitled "Computer Vision System for Position Monitoring in Three Dimensions Using Non-coplanar Light Sources Attached to a Monitored Object", is directed to a sensing system for determining the spatial position and orientation of a plurality of light sources attached to a rigid object. The system includes an electronic camera, a plurality of light emitting diodes (LEDs) and a computer. The plurality of LEDs includes at least four LEDs, which are mounted on a rigid object, in a non-coplanar arrangement.

Initially, the positions of the light sources are measured with respect to the coordinate system of the rigid object. The electronic camera captures images of the LEDs. The captured images contain spots corresponding to the detected light from each of the LEDs. A detector subsequently detects the location and the spot size corresponding to each LED in each captured video frame. The computer analyzes these locations and spot sizes, and generates approximations of the rotation matrix and translation vector of the object in the camera reference coordinate system. The orientation and position information is therefore obtained for each captured image frame.

U.S. Pat. No. 6,061,644 issued to Leis, and entitled "System for Determining the Spatial Position and Orientation of a Body", is directed to a real-time tracking system that simultaneously determines the spatial position and orientation of a plurality of bodies. The system includes a processor section, a common energy detection system and a plurality of markers. Each marker is either a passive retro-reflective or an active infrared energy LED. The processor section further includes a processor, a host computer and a display. The processor further includes a memory. The common energy detection system includes a pair of spaced-apart left and right sensor assemblies. Each sensor assembly includes a plurality of infrared energy emitting diodes and two two-dimensional charge couple device (CCD) sensors. A group of three markers is attached to a body. The group of markers is arranged in a distinct predetermined relative geometric relationship. The memory stores this unique signature of each of the group of markers.

The markers of the common energy detection system emit infrared light. The light emitted from the active markers or reflected from the passive markers is detected by the two two-dimensional CCD sensors and subsequently analyzed by the processor. The processor compares the stored unique signatures of the markers, with the detected images of the markers to identify each marked body and the orientation thereof. The host computer displays the spatial position of the bodies on the display.

U.S. Pat. No. 6,801,637 B2 issued to Voronka et al., and entitled "Optical Body Tracker", is directed to a real-time computer vision system for tracking moving individuals and objects. The system includes a plurality of optical tags, a tag controller, a position sensor and a camera array controller. The camera array controller includes an optical sync detector. The position sensor further includes three linear CCD cameras. The optical tags are infrared LEDs attached to different locations of an individual or an object. The infrared LEDs are wired to the tag controller. The CCD cameras are connected to the camera array controller. The tag controller activates and deactivates each infrared LED according to a timing sequence. This timing sequence is synchronized with the CCD cameras, via the camera array controller, to activate only one tag per camera exposure. The optical sync detector detects a first and a subsequent infrared light pulses from the infrared LEDs and triggers the camera array controller to initiate frame capture. The CCD cameras capture images of the infrared LEDs. The spatial location of the infrared LEDs is determined through triangulation techniques, by processing of the images captured by the CCD cameras.

U.S. Pat. No. 6,579,097 B1 issued to Sampson et al., and entitled "System and Method for Training in Military Operations in Urban Terrain", is directed to a system and method for military training employing simulated weapons. The system includes a stationary area effects weapon simulator, a plurality of player units, a plurality of small arm weapons, a plurality of helmets and a plurality of H-shaped vests. The stationary area effects weapon simulator further includes an optical divider and five infrared LEDs. Each helmet and each H-shaped vest includes a plurality of optical infrared detectors. Each small arm weapon includes a multiple integrated laser engagement system type small arms transmitter (SAT). The system is used by a plurality of soldiers. Each soldier is equipped with a player unit, a small arm weapon, a helmet and an H-shaped vest. The player unit of each soldier is connected to the optical infrared detectors of that soldier. A soldier targets another soldier by pulling the trigger of his weapon, thus emitting a laser beam. The shot is considered a hit if this beam is detected by the detectors on the H-shaped vest of the targeted soldier. The stationary area effects weapon simulator is mounted on the ceiling of a room inside a building. The optical divider confines the illumination of each infrared LED to five kill zone sectors. The infrared LEDs emit coded signals that simulate the activation of a weapon, such as the detonation of a bomb. Once a soldier enters an activated kill zone sector, the optical infrared detectors detect the coded signals and log the codes in the player unit.

SUMMARY OF THE DISCLOSED TECHNIQUE

It is an object of the disclosed technique to provide a novel method and system for simulating an armed combat, which overcomes the disadvantages of the prior art.

In accordance with the disclosed technique, there is thus provided a combat training system, including at least one target platform, at least one target acquisition apparatus and a training controller. The target platform includes a receiver, at least one modulated light emitter assembly and a modulation controller. The modulated light emitter assembly includes a plurality of light emitters arranged in a predetermined spatial configuration and emitting invisible light radiation. The light emitters define a local coordinate system. The modulation controller is coupled with the at least one modulated light emitter assembly and the receiver. The modulation controller sets the modulation of the light emission of the light emitters according to a predetermined modulation characteristic, the modulation characteristic being unique for the target platform.

The target acquisition apparatus includes a weapon activation sensor, an image detector, a modulated light detector, a weapon processor and a weapon transceiver. The weapon activation sensor is coupled with a weapon, for detecting activation of the weapon and producing a triggering signal. The image detector acquires an image of at least a portion of the target platform, in response to the triggering signal. The image detector line of sight of the image detector is aligned with the aiming direction of the weapon. The modulated light detector detects the light radiation. The modulated light detector line of sight of the modulated light detector is aligned with the aiming direction of the weapon. The weapon processor is coupled with the weapon activation sensor, the image detector and the modulated light detector. The weapon processor identifies the predetermined modulation characteristic from the detected light radiation, identifies the predetermined spatial configuration within a predetermined portion of the acquired image, determines a local coordinate system defined by the light emitters and produces a hit indication in response to coinciding occurrence of the predetermined modulation identification and the predetermined spatial configuration identification. The weapon transceiver is coupled with the weapon processor, and transmits the hit indication.

The training controller includes a main transceiver, a database, and a main processor. The main processor is coupled with the main transceiver and the database. The main transceiver communicates with the target platform and the target acquisition apparatus. The database stores at least one selected from the list consisting of: images acquired by the image detector, identities of the at least one target, a simulated viability status of the at least one target, and detection time of each of the acquired images.

In accordance with another embodiment of the disclosed technique, there is thus provided a combat training system, including at least one target platform, at least one target acquisition apparatus and a training controller. The target platform includes a receiver, at least one modulated light emitter assembly and a modulation controller. The modulated light emitter assembly includes a plurality of light emitters arranged in a predetermined spatial configuration and emitting invisible light radiation. The light emitters define a local coordinate system. The modulation controller is coupled with the at least one modulated light emitter assembly and the receiver. The modulation controller sets the modulation of the light emission of the light emitters according to a predetermined modulation characteristic, the modulation characteristic being unique for the target platform.

The target acquisition apparatus includes a weapon activation sensor, a modulated light detector, a weapon processor and a weapon transceiver. The weapon activation sensor is coupled with a weapon, for detecting activation of the weapon and producing a triggering signal. The modulated light detector acquires a modulation image of at least a portion of the modulated light emitter assembly, in response to the triggering signal. The modulated light detector line of sight of the image detector is aligned with the aiming direction of the weapon. The weapon processor is coupled with the weapon activation sensor and the modulated light detector. The weapon processor identifies the predetermined modulation characteristic from the detected light radiation, identifies the predetermined spatial configuration within a predetermined portion of the acquired modulation image, determines a local coordinate system defined by the light emitters and produces a hit indication in response to coinciding occurrence of the predetermined modulation identification and the predetermined spatial configuration identification. The weapon transceiver is coupled with the weapon processor, and transmits the hit indication.

The training controller includes a main transceiver, a database, and a main processor. The main processor is coupled with the main transceiver and the database. The main transceiver communicates with the target platform and the target acquisition apparatus. The database stores at least one selected from the list consisting of: images acquired by the image detector, identities of the at least one target, a simulated viability status of the at least one target, and detection time of each of the acquired images.

In accordance with another embodiment of the disclosed technique, there is thus provided a method for managing a simulated armed combat, including the procedure of attaching at least one modulated light emitter assembly having a plurality of light emitters, to each of a plurality of targets. Each of the light emitters emits modulated invisible light, the modulation characteristic of each of the modulated light emitter assemblies is unique for the target associated therewith. The method also includes the procedure of acquiring an image of at least a portion of the target by an image detector, in response to a weapon activation. The image detector line of sight of the image detector is with the aiming direction of the weapon. The method further includes the procedure of detecting the modulation characteristic of the modulated light emitter assembly by a modulated light detector, during the procedure of acquiring. The modulated light detector line of sight of the modulated light detector is aligned with the aiming direction of the weapon. The method also includes the procedure of identifying the target according to the detected unique modulation characteristic. The method further includes the procedure of determining a local coordinate system defined by the modulated light emitters, by identifying the light emitters in the acquired image. The method also includes the procedure of determining a simulated viability status of the target due to a shot simulated by the image detector, by determining the distance between a hit location of the simulated shot, and the coordinates of a viable item of the target, in the determined local coordinate system. The method further includes the procedure of notifying the identified target of a change in the viability status thereof.

In accordance with another embodiment of the disclosed technique, there is thus provided a method for managing a simulated armed combat, including the procedure of attaching at least one modulated light emitter assembly having a plurality of light emitters, to each of a plurality of targets. Each of the light emitters emits modulated invisible light, the modulation characteristic of each of the modulated light emitter assemblies is unique for the target associated therewith. The method further includes the procedure of acquiring a modulation image of at least a portion of the target by a modulated light detector, in response to a weapon activation. The modulated light detector line of sight of the modulated light detector is aligned with the aiming direction of the weapon. The method also includes the procedure of detecting the modulation characteristic of the modulated light emitter assembly by the modulated light detector during the procedure of acquiring. The method further includes the procedure of identifying the target according to the detected unique modulation characteristic. The method also includes the procedure of determining a local coordinate system defined by the modulated light emitters, by identifying the light emitters in the acquired modulation image. The method further includes the procedure of determining a simulated viability status of the target due to a shot simulated by the modulated light detector, by determining the distance between a hit location of the simulated shot, and the coordinates of a viable item of the target, in the determined local coordinate system. The method also includes the procedure of notifying the identified target of a change in the viability status thereof.

In accordance with a further embodiment of the disclosed technique, there is thus provided a target identification (ID) matrix, for coupling with a target platform, to be used in association with a target acquisition apparatus, the target acquisition apparatus including an image detector, the image detector acquiring an image of the target ID matrix. The target ID matrix includes a plurality of apertures arranged in a predetermined spatial configuration, each of the apertures being either open or closed. The apertures represent a unique representation, respective of the target. The target ID matrix also includes an orientation mark, located at a predetermined location relative to the apertures, for marking the orientation of the target ID matrix.

BRIEF DESCRIPTION OF THE DRAWINGS

The disclosed technique will be understood and appreciated more fully from the following detailed description taken in conjunction with the drawings in which:

FIG. 14A is a schematic illustration of a side view of a target identification (ID) matrix, constructed and operative according to another embodiment of the disclosed technique;

FIG. 14B is a schematic illustration of a front view of the target ID matrix of FIG. 14A.

DETAILED DESCRIPTION OF THE EMBODIMENTS

Figure 1:
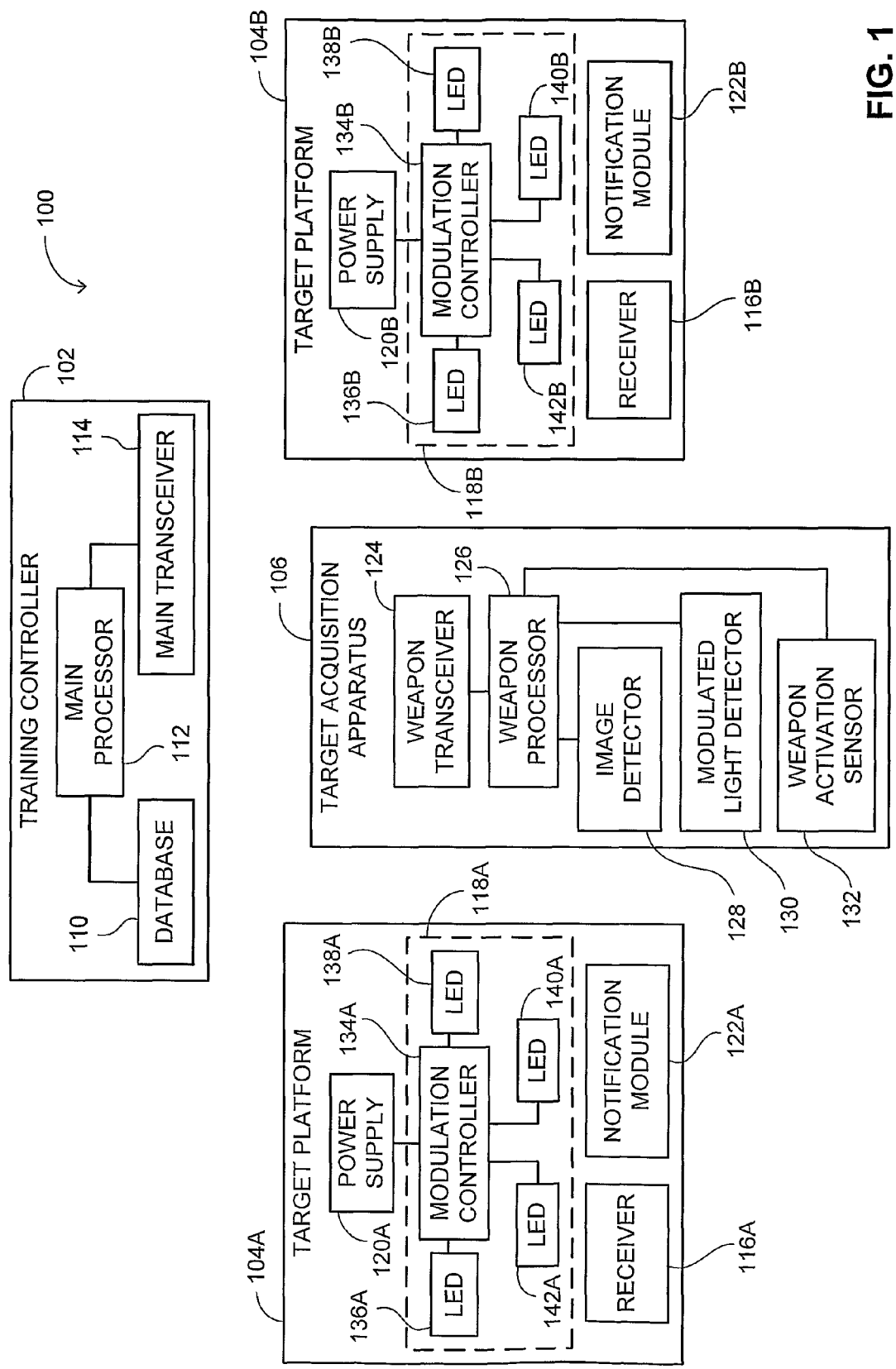
FIG. 1 is a schematic illustration of a combat training system, constructed and operative according to an embodiment of the disclosed technique.

The disclosed technique overcomes the disadvantages of the prior art by providing a target platform having a plurality of light emitters, arranged in a predetermined spatial configuration on a target, and a target acquisition apparatus having an image detector to detect an image of the spatial configuration. The target acquisition apparatus is attached to a weapon, held by a shooter who attempts a shot at the target. The target platform is attached to the target. The light emitters emit light at an invisible range of wavelengths, which is uniquely modulated, in order to enable identification of the target. The target acquisition apparatus includes a modulated light detector for detecting the identity of the target according to the unique modulation of the light emitters, respective of the target. A system according to the disclosed technique is typically employed in a combat training session, in which a plurality of targets and a plurality of shooters take part.

When a shooter points the weapon toward the target and activates it in order to shoot at the target, an image detector attached to the weapon acquires an image of the target, and a modulated light detector attached to the weapon detects a modulation of the light, emitted by the emitters coupled with the target. A weapon processor coupled with the modulated light detector and the image detector, determines a local coordinate system respective of those light emitters identified in the image. The weapon processor identifies the target, according to the modulation of the light emitters, as detected by the modulated light detector. The weapon processor also determines the severity of the shot (i.e., the viability status of the identified target), by measuring the distance between the coordinates of a calibrated center of the image, representing the hit location of that shot, and the coordinates of a viable organ of the target (e.g., heart, brain, liver). It is noted, that in the examples set forth hereinafter, the calibrated center of the image coincides with the center of the image detector, and will therefore be depicted at the center of the acquired image. However, the calibrated center of the image (i.e., the hit location) can be situated at an off-centered location of the acquired image, depending on the aiming precision of the shooter and on the physical alignment of the image detector relatively to the weapon.

The weapon processor sends data respective of the severity of the shot to the identified target, to enable the identified target to act accordingly (e.g., to leave the simulated battle scene, in a case where the shot was pointed toward the heart of the identified target). Each weapon processor uploads the data respective of the identity of the respective target, as well as the severity of the respective shot to a training controller, to enable the training controller to control the simulated combat (e.g., to notify each of the targets to act in a certain manner, to direct the participants in the simulated combat to end the simulated combat, to determine statistical data respective of the simulated combat).

The term "target" herein below, refers to a live human being, animated mannequin, ground vehicle (e.g., tank, truck, armored vehicle), aircraft, and the like. The term "weapon" herein below, refers to a firing device which is disabled from firing a projectile (e.g., a bullet, a cannon projectile), such as a rifle, machine gun, shot gun, revolver, paint-ball gun, cannon, turret of a tank, missile firing system of an aircraft, and the like. The term "shooter" herein below, refers to a live human being, as well as an automatic shooter, which employs the weapon to shoot at each of the targets.

The term "weapon activation sensor" herein below refers to a sensor which produces an electrical output, when the shooter performs the tasks necessary to activate the weapon. However, the weapon does not necessarily fire a projectile which can injure a human being. This is the case, for example, when a machine gun uses blank cartridges. This type of cartridge is employed to load the machine gun for the next stage of firing, by producing a high pneumatic pressure, and is applicable to combat training sessions, which employ the disclosed technique. In case of a machine gun, each time the weapon is loaded, the weapon activation sensor produces an electrical output. In case of a rifle, each time that the shooter pulls the trigger, the weapon activation sensor produces an electrical output.

The term "image detector" herein below, refers to a charge-coupled device (CCD), a complementary metal-oxide semiconductor (CMOS), and the like, which is operative to detect invisible light (e.g., near infrared, medium infrared, far infrared, ultraviolet). The term "modulated light detector" herein below, refers to an invisible light photoelectric detector which produces an electrical output in response to light impinging thereon. The term "notification module" herein below, refers to an audible indicator, a visible indicator or a tactile indicator, such as a loud speaker, a light source, a vibration generator, a pyrotechnic alert, and the like.

The terms "viable item", "vital item" or "viable organ" herein below, refer to an item of the target which is essential to the viability of the target. In case of a live target, the viable item is an organ or a limb of the target, such as the heart, kidneys, brain, lungs and the like. In case of a vehicle, the viable item is an engine of the vehicle, an airfoil of an aircraft, a fuel tank of the vehicle, and the like.

Reference is now made to FIG. 1, which is a schematic illustration of a combat training system, generally referenced 100, constructed and operative according to an embodiment of the disclosed technique. Combat training system 100 includes a training controller 102, a plurality of target platforms 104A and 104B, and a target acquisition apparatus 106.

Combat training system 100 is used in a combat training session, in which a plurality of targets (not shown) and at least one shooter (not shown) take part. Each target acquisition apparatus (e.g. 106) is coupled with a respective weapon, operated by a respective shooter. Each target platform (e.g. 104A, 104B) is coupled with a respective target. In the case where training is conducted in an urban setting, wherein the participants are soldiers, each of the soldiers is equipped with a target acquisition apparatus as well as with a target platform. In this manner, each soldier acts as a shooter as well as a target. Some of the participants are equipped only with a target platform, for acting as unarmed non-hostile entities.

Training controller 102 includes a database 110, a main processor 112 and a main transceiver 114. Main processor 112 is coupled with database 110 and with main transceiver 114.

Target acquisition apparatus 106 includes a weapon transceiver 124, a weapon processor 126, an image detector 128, a modulated light detector 130 and a weapon activation sensor 132. Weapon processor 126 is coupled with weapon transceiver 124, image detector 128, modulated light detector 130 and with weapon activation sensor 132. Alternatively, weapon activation sensor 132 is directly coupled with image detector 128 and with modulated light detector 130. Weapon transceiver 124 is coupled with main transceiver 114 and with receivers 116A and 116B by a wireless link. Main transceiver 114 is coupled with receivers 116A and 116B by a wireless link.

Target platform 104A includes a receiver 116A, a modulated light emitter assembly 118A, a power supply 120A and a notification module 122A. Target platform 104B includes a receiver 116B, a modulated light emitter assembly 118B, a power supply 120B and a notification module 122B. Modulated light emitter assembly 118A includes a modulation controller 134A and a plurality of emitters 136A, 138A, 140A and 142A. Modulated light emitter assembly 118B includes a modulation controller 134B and a plurality of emitters 136B, 138B, 140B and 142B.

Power supply 120A is coupled with receiver 116A, modulated light emitter assembly 118A, and with notification module 122A. Power supply 120B is coupled with receiver 116B, modulated light emitter assembly 118B, and with notification module 122B. Modulation controller 134A is coupled with receiver 116A, emitters 136A, 138A, 140A and 142A, power supply 120A. Modulation controller 134B is coupled with receiver 116B, emitters 136B, 138B, 140B and 142B and with power supply 120B. Each of emitters 136A, 138A, 140A, 142A, 136B, 138B, 140B and 142B is in form of a light emitting diode (LED), which emits light in an invisible range of wavelengths (e.g., near infrared, medium infrared, far infrared, ultraviolet). Alternatively, each of modulated light emitter assemblies 118A and 118B can include a single light source (not shown), optically coupled to the group of emitters via light guides (e.g., optical fibers). Each of emitters 136A, 138A, 140A, 142A, 136B, 138B, 140B and 142B emit light in an omni-directional manner (or at a wide angle of, for example, 180°).

Modulation controller 134A modulates the light emission of emitters 136A, 138A, 140A, 142A, such that the light emitted there from has a first modulation characteristic. Modulation controller 134B modulates the light emission of emitters 136B, 138B, 140B, 142B, such that the light emitted there from has a second modulation characteristic, different than the first modulation characteristic. In this manner, target platforms 104A and 104B are distinguishable according to their respective modulation characteristics. Furthermore, each of emitters 136A, 138A, 140A and 142A may be modulated according to a different modulation characteristic, such that each emitter is distinguishable with respect to other emitters, within the same light emitter assembly.

The term "modulation characteristic" herein below, refers to a manner in which the light emission is modulated. The light emission can be modulated in the frequency domain (i.e., light emitters of each light emitter assembly are set to blink at a unique frequency). Alternatively, the light emission is modulated according to a unique blinking pattern (code), determined by the modulation controller of the light emitter assembly. For example, in a case where modulation is achieved in the frequency domain, each of emitters 136A, 138A, 140A, 142A can continuously blink at a frequency of 2000 Hz, while each of emitters 136B, 138B, 140B, 142B blink at a frequency of 1000 Hz. Alternatively, when each of emitters 136A, 138A, 140A, 142A blink according to a first blinking pattern (e.g., a binary pattern), representing a code 2000, each of emitters 136B, 138B, 140B, 142B blink according to a second, different, blinking pattern, representing a code 1000.

The shooter operating target acquisition apparatus 106 activates the weapon, with which target acquisition apparatus 106 is coupled, after pointing the weapon toward a target associated with target platform 104A. The shooter thereby simulates a shot at that target. Weapon activation sensor 132 senses the activation of the weapon, and produces a triggering signal to direct image detector 128 to acquire an image of at least a portion of that target. The calibrated center of the acquired image represents the hit location of the simulated shot. The triggering signal produced by weapon activation sensor 132 also directs modulated light detector 130 to detect invisible light, emitted by emitters 136A, 138A, 140A and 142A. Additionally or alternatively, upon sensing of the activation of the weapon, weapon transceiver 124 can transmit an activation signal to at least one target platform of the target platforms participating in the simulated battle, to activate the light emitters thereof. For example, weapon transceiver 124 can transmit an activation signal to target platform 104A, to activate light emitters 136A, 138A, 140A and 142A, to emit light. Light emitters 136A, 138A, 140A and 142A do not emit light before receiver 116A receives the activation signal. After a predetermined period of time (e.g., after image detector 128 has acquired the image of the target, and after modulated light detector 130 has detected the invisible light emitted by the emitters), weapon transceiver 124 can transmit a deactivation signal to the target platform, in order to deactivate the light emitters thereof. In this manner, the light emitters of the target emit light only when a shot is simulated.

Weapon processor 126 processes the acquired image to determine a local coordinate system defined by emitters 136A, 138A, 140A and 142A. Weapon processor 126 registers the coordinates of a vital item of the target, prior to the simulated combat session. Weapon processor 126 determines the distance between the coordinates of the vital item, and the hit location, to determine the viability status (e.g. slightly injured, severely injured, incapacitated) of the target, due to the simulated shot. Weapon processor 126 also determines the modulation characteristic of the light detected by modulated light detector 130 (e.g., the blinking frequency or the blinking pattern). Weapon processor 126 also identifies target platform 104A by comparing the modulation characteristic with data stored in a memory unit (not shown).

Weapon transceiver 124 transmits a hit indication representing the viability status respective of the target. Receiver 116A receives this hit indication. In a case where the viability status of the respective target has changed, due to the simulated shot, modulation controller 134A sets a different modulation characteristic to the emission of the light emitted by emitters 136A, 138A, 140A and 142A. The new modulation characteristic represents the current viability status of the target associated with target platform 104A. Notification module 122A generates a notification to notify the associated target of the current viability status. Notification module 122A can further instruct the associated target on how to behave in response to the change in the viability status thereof.

Target acquisition apparatus 106 also sends the identity of the respective target and the current viability status thereof to training controller 102. Main processor 112 stores the data received from target acquisition apparatus 106 in database 110. Main processor 112 performs different operations associated with the combat training session, such as notifying the targets, the shooters (i.e., using the respective weapon transceivers), and the non-hostile entities to halt the combat training, to produce statistical data relevant to the combat training session, and the like. Training controller 102 can also transmit (i.e., via main transceiver 114) data respective of the combat training session, to a session manager (not shown), for analyzing the progress of the combat training session, in real time, or for performing After Action Review (AAR).

Figure 2A:
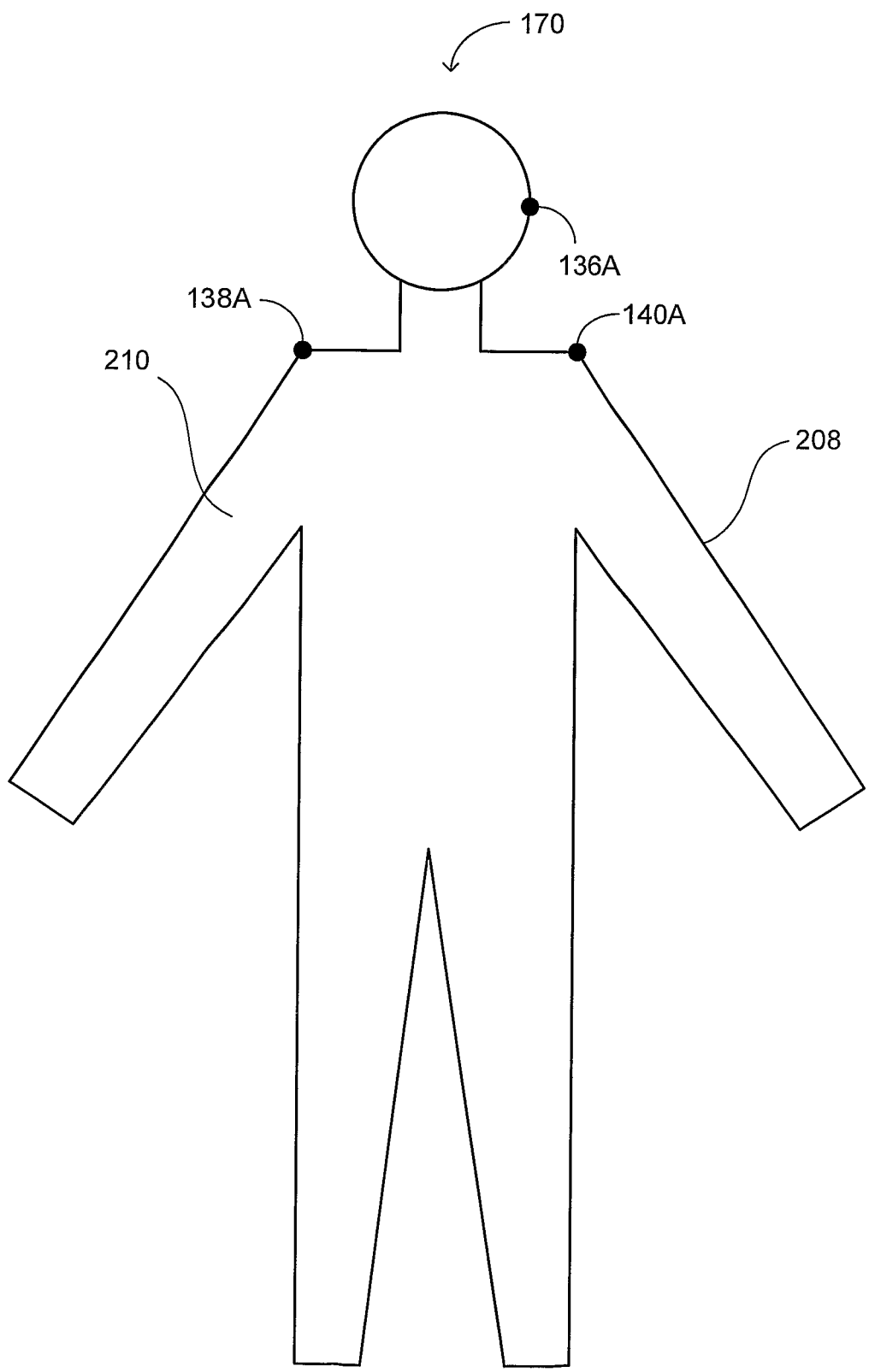
FIG. 2A is a schematic illustration of a target associated with the combat training system of FIG. 1.
Figure 2B:
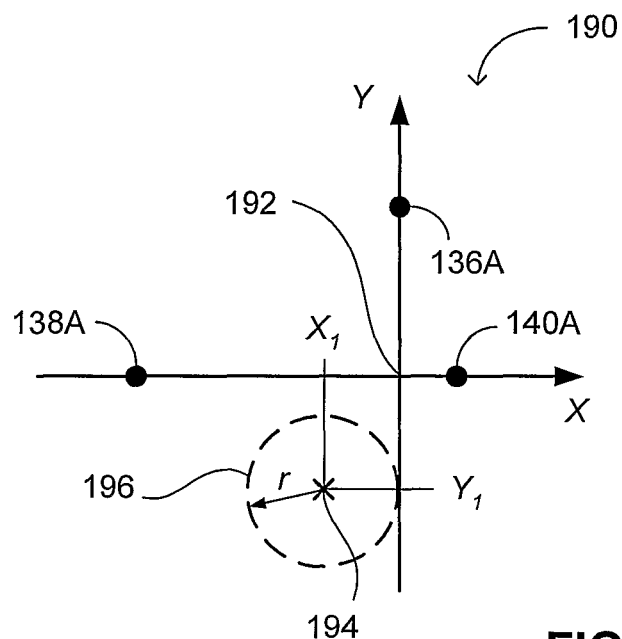
FIG. 2B is a schematic illustration of a local coordinate system defined by a plurality of emitters of a modulated light emitter assembly of the combat training system of FIG. 1, attached to the target of FIG. 2A.
Figure 2C:
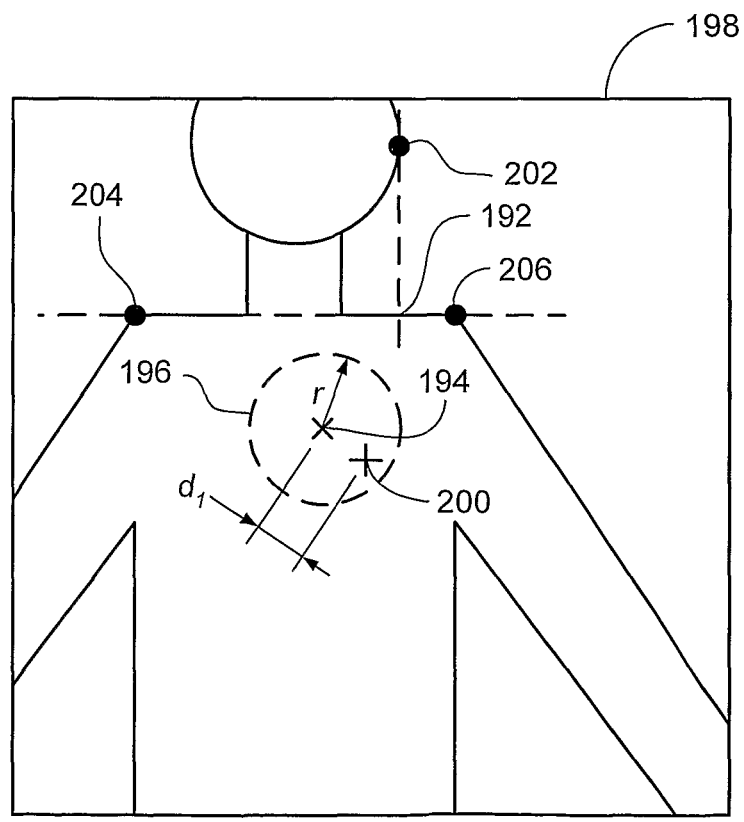
FIG. 2C is a schematic illustration of an image acquired by the image detector of the target acquisition apparatus of the combat training system of FIG. 1, which includes a representation of a shot located within the hit region of FIG. 2B.
Figure 2D:
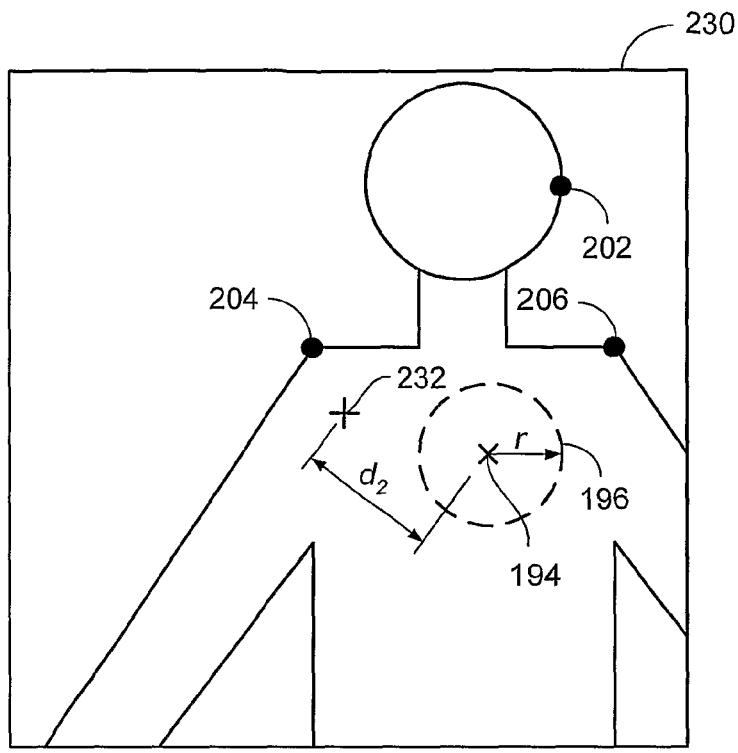
FIG. 2D is a schematic illustration of an image acquired by the image detector of the target acquisition apparatus of the combat training system of FIG. 1, which includes a representation of a shot located within a contour of the target, but outside the hit region of FIG. 2B.
Figure 2E:
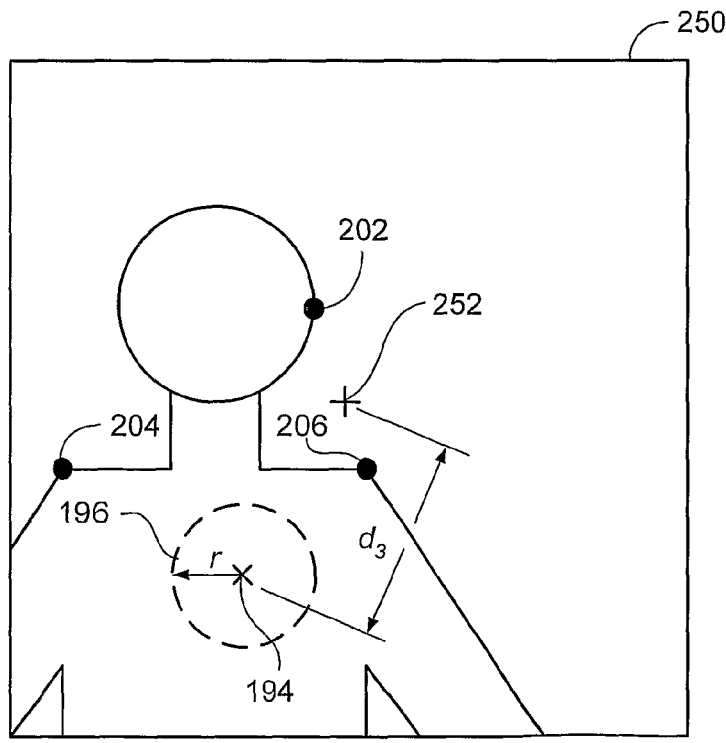
FIG. 2E is a schematic illustration of an image acquired by the image detector of the combat training system of FIG. 1, which includes a representation of a shot located outside the contour of the target, as well as outside the hit region of FIG. 2B.

Reference is further made to FIGS. 2A, 2B, 2C, 2D and 2E. FIG. 2A is a schematic illustration of a target, generally referenced 170, associated with the combat training system of FIG. 1. FIG. 2B is a schematic illustration of a local coordinate system defined by a plurality of emitters of a modulated light emitter assembly of the combat training system of FIG. 1, attached to the target of FIG. 2A. FIG. 2C is a schematic illustration of an image acquired by the image detector of the target acquisition apparatus of the combat training system of FIG. 1, which includes a representation of a shot located within the hit region of FIG. 2B. FIG. 2D is a schematic illustration of an image acquired by the image detector of the target acquisition apparatus of the combat training system of FIG. 1, which includes a representation of a shot located within a contour of the target, but outside the hit region of FIG. 2B. FIG. 2E is a schematic illustration of an image acquired by the image detector of the combat training system of FIG. 1, which includes a representation of a shot located outside the contour of the target, as well as outside the hit region of FIG. 2B.

With reference to FIGS. 1 and 2A, emitter 136A is attached to the head of target 170, emitter 138A to the right shoulder of target 170, and emitter 140A to the left shoulder thereof. With reference to FIGS. 1 and 2B, emitters 136A, 138A and 140A are arranged in a triangular configuration, which defines a two-dimensional local coordinate system 190. A line drawn between a representation of emitters 138A and 140A, defines the X axis of coordinate system 190, and a normal drawn from a representation of emitter 136A to the X axis defines the Y axis of coordinate system 190. The intersection of the X axis and the Y axis defines an origin 192 of coordinate system 190. A viable organ of target 170 (e.g., heart, brain, lung, kidney) is represented by a cross 194 in coordinate system 190 having the coordinates $(X_1, Y_1)$. A simulated shot toward target 170 is considered to hit viable organ 194, if the shot is hit within a hit region 196 (e.g., in form of a circle), whose center is located at viable organ 194, and whose radius is referenced by the letter r. Alternatively, hit region 196 is in form of a closed curve, in shape of a representative two-dimensional contour of viable organ 194.

With reference to FIGS. 1 and 2C, when the shooter performs all the necessary tasks in order to activate the weapon, weapon activation sensor 132 produces a triggering signal to activate image detector 128 (either via weapon processor 126 or directly), to acquire an image 198 of at least a portion of target 170. A center of image 198 is represented by a cross 200. The triggering signal produced by weapon activation sensor 132 also activates modulated light detector 130 (either via weapon processor 126 or directly), to detect invisible light emitted by each of emitters 136A, 138A and 140A.

Before the combat training session begins, each of image detector 128 and modulated light detector 130 is registered with the weapon. Image detector 128 is registered with the weapon, such that a line of sight of image detector 128 is aligned with the aiming direction of the weapon (e.g., a cross—not shown—in a viewer of the weapon, representing the target, matches center 200 of image 198). Modulated light detector 130 is registered with the weapon, such that a line of sight of modulated light detector 130 is aligned with the aiming direction of the weapon. It is noted, that the installation of target acquisition apparatus 106 (including the registration of image detector 128 and modulated light detector 130) on the weapon, requires no alterations to the weapon. Each shooter, participating in the simulated combat session, can thus use his personal weapon, to which he is accustomed, after installing the target acquisition apparatus.

Before the combat training session begins, combat training system 100 is calibrated in the following manner. In the following description, main processor 112 can alternatively or additionally refer to weapon processor 126. Furthermore, weapon processor 126 can store data in a memory (not shown) coupled thereto or alternatively incorporated therewith. In a case where the memory of weapon processor 126 can store no further data, the shooter can replace that memory unit with another memory unit, to allow further storing of data related to the respective weapon and shooter. Data stored in the memory unit can include, for example, identities of the targets, simulated viability status of the targets, times of occurrence of combat events (e.g., detection time of the acquired images or a time of hitting of the target by the simulated shot), and the like.

Main processor 112 stores a representative two-dimensional contour 208 (FIG. 2A) of the body of target 170 (i.e., a median contour of the contours of a plurality of targets) in database 110. Alternatively, main processor 112 stores the contours of each of the targets in database 110, who take part in the combat training session. Main processor 112 registers the coordinates of emitters 136A, 138A and 140A, with the head, the right shoulder, and with the left shoulder, respectively, of contour 208, before the combat training session begins.

The emitters respective of all the targets can be located at the same location on the body (e.g., on the body of each of targets, one emitter is located on the head thereof, a second one on the right shoulder thereof, and a third one on the left shoulder thereof). Alternatively, the emitters respective of each target can be located at different locations on the body (e.g., one emitter on the head and two emitters on the two shoulders of the body of a first target, and one emitter on the head and two emitters on two sides of the abdomen of the body of a second target).

Main processor 112 registers the coordinates of each of the viable organs of target 170 (e.g., viable organ 194), with origin 192 of coordinate system 190, before the combat training session begins. Main processor 112 stores the coordinates of each of the hit regions of the respective viable organ (i.e., a region within which a simulated shot is considered a hit of that viable organ), in database 110.

Main processor 112 can store data respective of the target platform of each participant in the combat training session, by registering the specific spatial configuration of the light emitter assembly, and the coordinates of viable organs of that participant. Alternatively, main processor 112 can define models of spatial configurations and coordinates of viable organs and their respective hit regions. Such models can be set according to different sizes of participants, for example, small, medium and large. Each model defines the data respective of the light emitter assembly, the coordinates of viable organs and their respective hit regions. Before the combat training session begins, each participant is ascribed a model according to his size. Main processor 112 then registers all the relevant data with each participant, according to the ascribed model of that participant.

Image 198 includes a representation of emitters 136A, 138A and 140A, designated by dots 202, 204 and 206, respectively. Weapon processor 126 processes image 198 to identify coordinate system 190, according to the configuration of dots 202, 204 and 206. Weapon processor 126 determines the coordinates of origin 192 of coordinate system 190 relative to center 200 of image 198. Accordingly, weapon processor 126 determines the coordinates of hit region 196 of viable organ 194, in coordinate system 190. Weapon processor 126 determines a distance $d_1$ between the coordinates of center 200 of image 198 (i.e., the cross within the viewer of the weapon) and the coordinates of viable organ 194. In the example set forth in FIG. 2C, the distance $d_1$ is equal to or less than the radius r of hit region 196. Therefore, weapon processor 126 determines that a simulated shot fired by the weapon coupled with target acquisition apparatus 106, has hit viable organ 194, and accordingly produces viability status data respective of target 170. It is noted, that each of emitters 136A, 138A and 140A can emit light according to a different modulation characteristic, in order to distinguish between different locations on target 170.

Weapon transceiver 124 transmits the viability status data respective of target 170 to receiver 116A. Alternatively, weapon transceiver 124 can transmit the modulation characteristic of target platform 104A and the current viability status of the target associated therewith, to training controller 102. Main processor 112 then identifies that target according to the modulation characteristic, using database 110, and sends the hit indication to receiver 116A, using main transceiver 114. Modulation controller 134A modifies the modulation characteristic of the emission of light emitted by each of emitters 136A, 138A, and 140A according to this viability status data. In the example illustrated in FIG. 2C, the simulated shot has hit the heart of target 170. Therefore, target 170 is considered incapacitated (e.g., dead). For example, when target 170 is considered alive and uninjured, modulation controller 134A modulates the emission of light emitted by each of emitters 136A, 138A, and 140A at 2000 Hz. When target 170 is considered dead, modulation controller 134A modifies the modulation of emission of the light emitted by each of emitters 136A, 138A, and 140A, for example, to blink at a frequency of 2030 Hz. Alternatively, if target 170 is considered alive and uninjured, then each of emitters 136A, 138A, and 140A blink according to a blinking pattern, representing the code 2000. When target 170 is considered dead, modulation controller 134A modifies the modulation of emission of the light emitted by each of emitters 136A, 138A, and 140A, for example, to blink according to a blinking pattern, representing a code 2030.

Another target acquisition apparatus (not shown) which attempts a shot at target 170, determines that target 170 is dead, by detecting the new modulation frequency of 2030 Hz (or the new code 2030 of the blinking pattern). Notification module 122A produces an audio indication (e.g., a sound), a visual indication (e.g., light at a predetermined wavelength and blinking frequency), a tactile alert (e.g., a vibration) or a pyrotechnic alert (e.g., by releasing smoke), to notify the other participating shooters that target 170 is considered dead. Alternatively or additionally, the other target acquisition apparatus can inform the respective shooter, that the target, at which the shooter aims, is dead, and that a shot at this target shall be ineffective. Such notification may assist in ammunition control. The other target acquisition apparatus receives an appropriate notification signal, through its weapon transceiver. The other shooter can be informed of the viability status of the target by an audible notification, for example, through an earphone (not shown). Furthermore, notification module 122A notifies target 170 to behave in a predetermined manner, for example, to lie on the ground, leave the simulated combat training scene, and the like. If the participant, who is considered as a dead target, also carries a simulated weapon in the simulated combat, then that simulated weapon may be disabled right after suffering a "lethal" shot. In such a case (i.e., after the participant is considered dead), the image detector (or the modulation detector, or both) of the respective target acquisition apparatus is disabled and does not acquire further images. In this manner, a "dead" participant is prevented from taking further action in the simulated combat.

Additionally, weapon transceiver 124 transmits the viability status data respective of target 170, as well as identification data respective of target 170, as determined by weapon processor 126, to main transceiver 114. Weapon transceiver 124 can also transmit the images acquired by image detector 128 and the time of acquiring each image. Main processor 112 stores this data in database 110 to perform different operations respective of the combat training session, such as notifying the targets, the shooters, and the non-hostile entities to halt the combat training, to produce statistical data relevant to the combat training session, and the like.

Modulated light detector 130 detects light for a predetermined period of time, upon activation of the weapon. For example, modulated light detector 130 detects light emitted by each of emitters 136A, 138A, and 140A for 10 milliseconds. This predetermined period of time is sufficient for weapon processor 126 to determine the modulation characteristic of the light detected by modulated light detector 130. Modulated light detector 130 can operate following the image acquisition by image detector 128, or simultaneously with the operation of image detector 128.

It is noted, that image detector 128 can be a thermal image detector. In this case, each of emitters 136A, 138A, and 140A emit thermal radiation. Additionally, a shutter can alternatively block and allow the passage of thermal radiation, emitted by the thermal emitter, in order to modulate the thermal radiation emission at a desired frequency or according to a desired blinking pattern. Image detector 128 can alternatively acquire a video image of target 170. In this case, weapon processor 126 processes the video image frame by frame to determine the viability status of target 170, as described herein above. When weapon processor 126 is overloaded, weapon transceiver 124 can upload image 198 (either still image or video image) to main transceiver 114, to enable main processor 112 to share the workload of weapon processor 126. Target acquisition apparatus 106 can then download the viability status data and the target identification data from main transceiver 114, through weapon transceiver 124.

With reference to FIGS. 1, 2A, and 2D, image detector 128 acquires an image 230 of a portion of target 170. Weapon processor 126 determines a distance $d_2$ between the coordinates of a center 232 of image 230, and the coordinates of viable organ 194. Weapon processor 126 determines that the value of distance $d_2$ is greater than of radius r of hit region 196. Furthermore, weapon processor 126 determines that the coordinates of center 232 is within the coordinates of the contour 208 of target 170, by retrieving data respective of contour 208, from database 110. Alternatively, weapon processor 126 can determine that the coordinates of center 232 is within contour 208, by employing an algorithm. Hence, weapon processor 126 determines that the simulated shot has hit target 170 at a non-viable organ (e.g., a right arm 210 of target 170), and that target 170 is for example, slightly injured, but alive.

Weapon transceiver 124 transmits this viability status data to receiver 116A. Modulation controller 134A modifies the modulation characteristic of the emission of light emitted by each of emitters 136A, 138A, and 140A, to represent this viability status. In this case, modulation controller 134A directs each of emitters 136A, 138A, and 140A to blink for example, at 2020 Hz (or according to a pattern representing a code 2020), to indicate to target acquisition apparatus 106 that target 170 is slightly injured. Notification module 122A produces an alert, in response to receiver 116A receiving the viability status data.

With reference to FIGS. 1, 2A, and 2E, image detector 128 acquires an image 250 of target 170. Weapon processor 126 determines that a distance $d_3$ between the coordinates of a center 252 of image 250, and the coordinates of viable organ 194 of target 170 is greater than radius r of hit region 196. Weapon processor 126 furthermore determines that the coordinates of center 252 is outside the confines of contour 208 of target 170. Therefore, weapon processor 126 determines that the simulated shot has missed target 170. In this case, weapon transceiver 124 transmits no viability status data to receiver 116A regarding the viability status of target 170. Weapon transceiver 124 can transmit the results of the simulated shot (i.e., that the shooter missed target 170) to main transceiver 114. Main processor 112 can produce statistical data respective of the combat training session, as well as perform ammunition management and control, accordingly.

Since a minimum of three points is required in order to define a coordinate system, a minimum of three emitters is required for each target platform of combat training system 100 to be operative. More than three emitters can also be employed in the disclosed technique, yielding various configurations, for example, a square, a pentagon, a hexagon, and the like. Employment of more than three emitters is necessary, for determining the respective coordinate system, for example, when the image acquired by the image detector includes representations of only a portion of the emitters. Such employment is also necessary when the orientation of the target is of such a nature that three emitters provide insufficient data. It is noted, that combat training system 100 can also be operative when the light emitter assembly of a target platform includes only two emitters, defining a directional vector, as will be described herein after, with reference to FIGS. 13A and 13B.

It is noted, that combat training system 100 can operate in conjunction with a location identification system, such as DTACTe (Distributed Tactical C³ and Training), to identify the current location of each of the participants (i.e., the shooters, the targets and the non-hostile entities), who take part in the combat training session. Such a system can operate based on a Global Positioning System (GPS), a cellular system, multiple cameras, a Radio Frequency Identification (RFID) system and the like. When an RFID system is used, each of the participants of the simulated combat are equipped with a tag, transmitting a signal, indicative of that participant. A plurality of tag readers are positioned within the environment of the simulated combat (e.g., a room or a hall), receiving signals from the tags and positioning the participants in that environment. It is noted, that when an RFID system is used, a simulated hand-thrown explosive (e.g., a hand grenade), can also be equipped with a tag, providing the position of the simulated hand grenade. When the simulated hand grenade is activated and thrown, the RFID system identifies the location of the simulated explosion of that simulated hand grenade. The system analyzes the casualties suffered from the simulated explosion, according to the positions of the participants in the simulated combat, at the time of the simulated explosion. The training controller of the combat simulation system can then inform the participants, who have suffered a hit from the simulated explosion, of their new viability statuses (e.g., severely injured or dead). In response, these participants can behave according to their new viability statuses.

A target acquisition apparatus of combat training system 100 can be mounted on a simulated hand grenade. The image detector of the target acquisition apparatus can include a panoramic camera. As the hand grenade is operated and thrown, the panoramic camera acquires an image (or sequence of images). Additionally, the modulated light detector detects the modulation characteristic of light, emitted by light emitters of a target platform, toward which the hand grenade is thrown. The target acquisition apparatus can then determine the identity of this target platform. According to the range between the identified target platform and the simulated hand grenade, the target acquisition apparatus can determine whether this target has been hit by the simulated grenade explosion. The range between the target and the hand grenade can be determined by employing the location identification system, or by processing the acquired image, as elaborated herein after with reference to FIGS. 3A-9B. When that target is hit, the target acquisition apparatus generates a hit indication, as described herein with reference to target acquisition apparatus 106.

It is further noted, that target acquisition apparatus 106 can further include a first optical assembly (e.g., one or more lenses, not shown), located in front of image detector 128, to project an image of an object (not shown) on an object plane (not shown) of image detector 128. Target acquisition apparatus 106 can also include a second optical assembly (not shown), located in front of modulated light detector 130, to detect light within a predetermined field of view. The second optical assembly is necessary when modulated light detector 130 is to detect light emitted only from emitters 136A, 138A, 140A, and 142A of target platform 104A, and to detect substantially no light emitted by emitters 136B, 138B, 140B, and 142B of target platform 104B, located in the vicinity of target platform 104A.

Certain weapons may include an optically enhanced viewfinder (e.g., a sniper gun viewfinder), which typically include an array of magnifying lenses. This viewfinder can be exploited to enhance the optical resolution of image detector 128 or of modulated light detector 130, by placing an optical beam splitter between the lenses and the eye of the shooter. Light entering the viewfinder passes through the lenses and reaches the beam splitter. The light is split, such that a portion thereof is directed toward the eye of the shooter, looking through the viewfinder. Another portion of the light is directed by the beam splitter toward image detector 128 or modulated light detector 130. In this manner, image detector 128, or modulated light detector 130, receive a magnified view of the scene viewed by the shooter. Thus, when an optically enhanced viewfinder is used, no additional optical assembly is required in order to optically enhance the view of image detector 128, or modulated light detector 130.

Figure 3A:
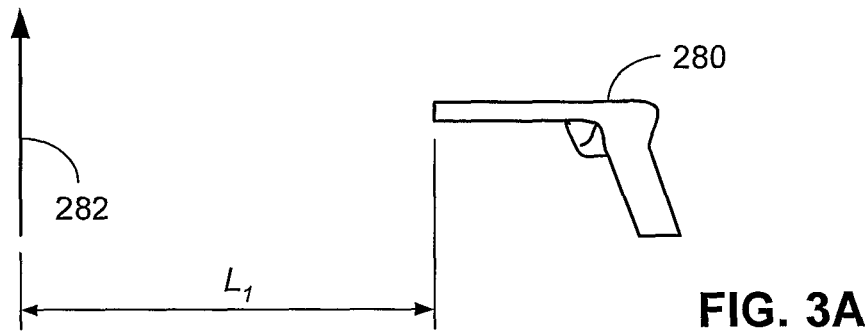
FIG. 3A is a schematic illustration of a weapon located at a substantially short range from a target.
Figure 3B:
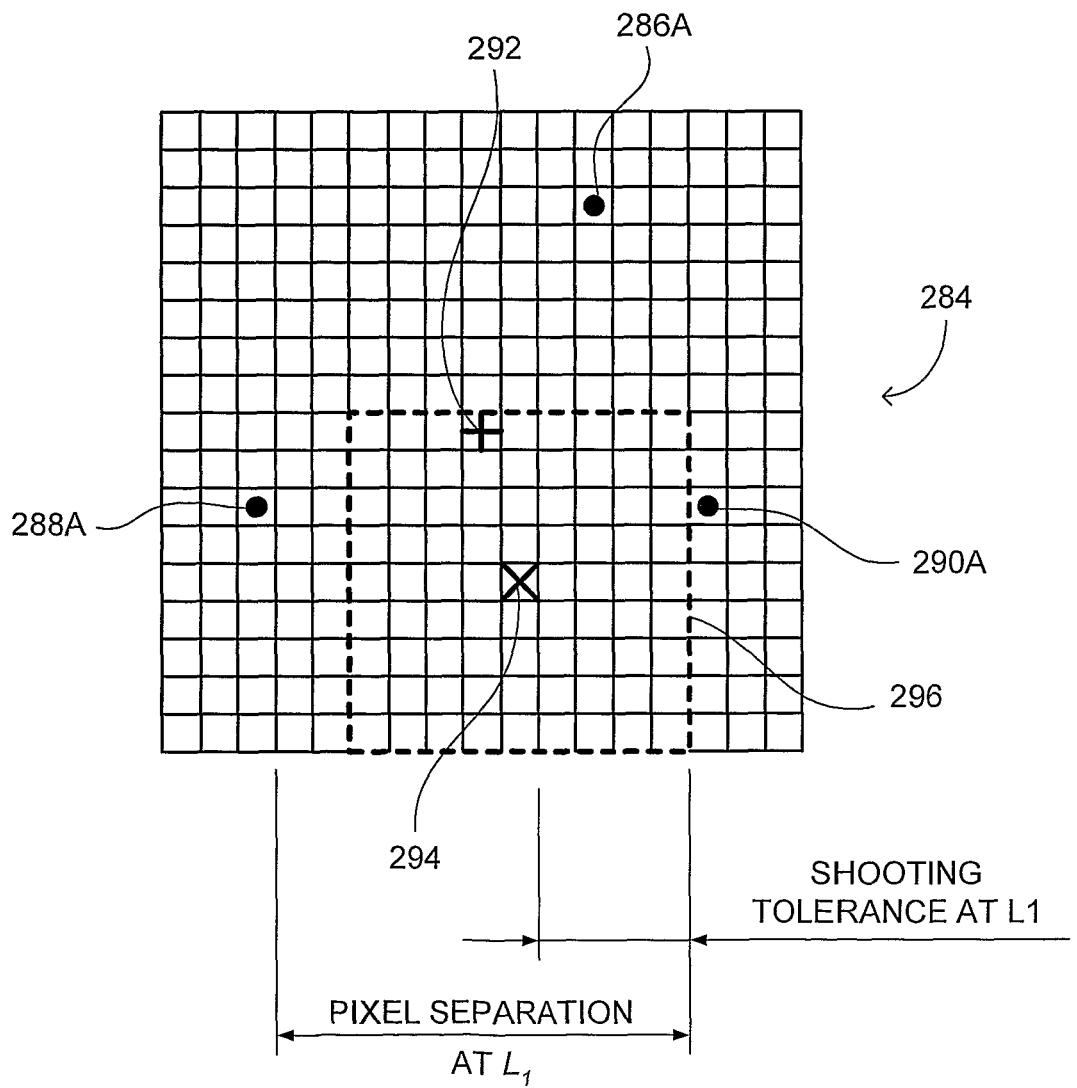
FIG. 3B is a schematic illustration of an image detected by the image detector of the target acquisition apparatus of the combat training system of FIG. 1, employed for determining the range of the weapon of FIG. 3A from the target.
Figure 4A:
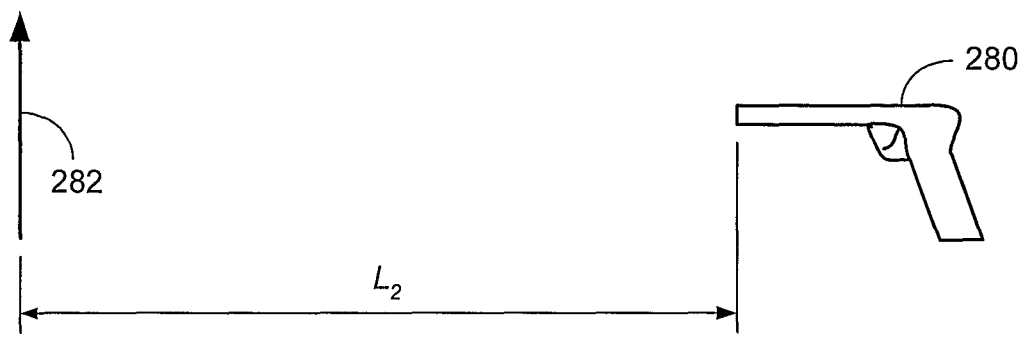
FIG. 4A is a schematic illustration of the weapon of FIG. 3A, located at a substantially long range from the target.
Figure 4B:
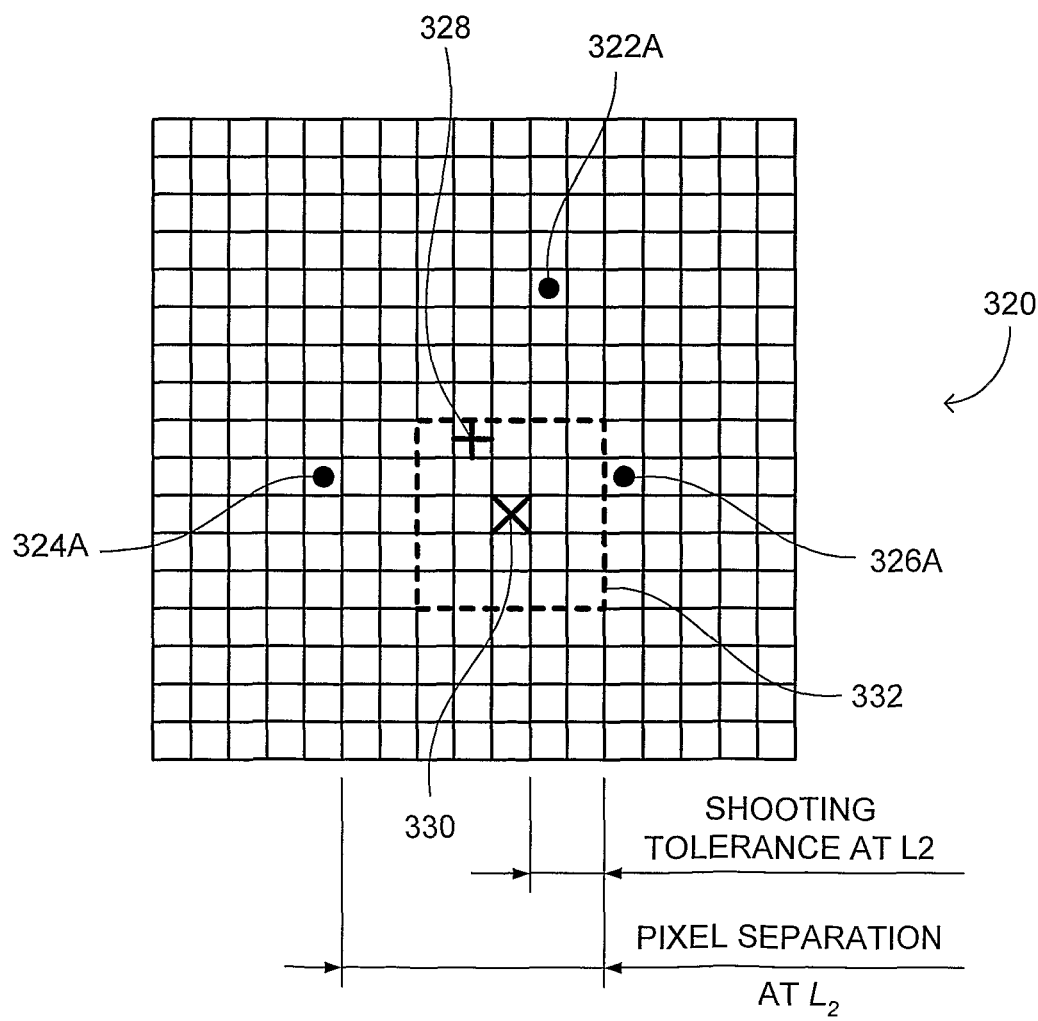
FIG. 4B is a schematic illustration of an image detected by the image detector of the target acquisition apparatus of the combat training system of FIG. 1, employed for determining the range of the weapon of FIG. 4A from the target.

Reference is now made to FIGS. 3A, 3B, 4A, and 4B. FIG. 3A is a schematic illustration of a weapon, generally referenced 280, located at a substantially short range from a target. FIG. 3B is a schematic illustration of an image detected by the image detector of the target acquisition apparatus of the combat training system of FIG. 1, employed for determining the range of the weapon of FIG. 3A from the target. FIG. 4A is a schematic illustration of the weapon of FIG. 3A, located at a substantially long range from the target. FIG. 4B is a schematic illustration of an image detected by the image detector of the target acquisition apparatus of the combat training system of FIG. 1, employed for determining the range of the weapon of FIG. 4A from the target.

With reference to FIG. 3A, weapon 280 is located at a substantially short range $L_1$ from a target 282. With reference to FIG. 3B, an image 284 of target 282 as detected by image detector 128 (FIG. 1), includes representations 286A, 288A, and 290A, of emitters 136A (FIG. 1), 138A, and 140A, respectively. A center of image 284 is referenced by a cross 292. A representation of a viable organ of target 170 (FIG. 2A) is referenced by a cross 294. A hit region of the viable organ of target 170 is designated by a square 296. At the substantially short range $L_1$, the boundaries of square 296 extend four pixels to the right and to the left of representation 294 of the viable organ, and four pixels above and below representation 294 of the viable organ.

Therefore, the tolerance of a simulated shot from representation 294 of the viable organ at the substantially short range $L_1$, is four pixels (i.e., the simulated shot is considered a hit, if a representation thereof is located within four pixels from representation 294 of the viable organ, in each direction). Center 292 of image 284 (i.e., the cross which is viewed by the shooter in the weapon viewing sight (or viewing sight) of the weapon) is located four pixels above representation 294 of the viable organ, and one pixel to the left thereof. Therefore, in the example set forth in FIG. 3B, the simulated shot is a hit. At the substantially short range $L_1$, representations 288A and 290A are separated by eleven pixels.

With reference to FIG. 4A, weapon 280 is located at a substantially long range $L_2$ from target 282. With reference to FIG. 4B, an image 320 of target 282 as detected by image detector 128 (FIG. 1), includes representations 322A, 324A, and 326A, of emitters 136A (FIG. 1), 138A, and 140A, respectively. A center of image 330 is referenced by a cross 328. A representation of a viable organ of target 170 (FIG. 2A) is referenced by a cross 330. A hit region of the viable organ of target 170 is designated by a square 332. At the substantially long range $L_2$, the boundaries of square 332 extend two pixels to the right and to the left of representation 330 of the viable organ, and two pixels above and below representation 330 of the viable organ.

Therefore, the tolerance of a simulated shot from representation 330 of the viable organ at the substantially short range $L_2$, is two pixels (i.e., the simulated shot is considered a hit, if a representation thereof is located within two pixels from representation 330 of the viable organ, in each direction). Center 328 of image 320 (i.e., the cross which is viewed by the shooter in the viewer of the weapon) is located one pixels above representation 330 of the viable organ, and one pixel to the left thereof. Therefore, in the example set forth in FIG. 4B, the simulated shot is also a hit, although the tolerance of the simulated shot is less than that which is described herein above in connection with FIG. 3B. At the substantially long range $L_2$, representations 324A and 326A are separated by seven pixels.

It is noted, that as the range between a weapon and a target increases, the representations of every pair of the emitters (similar to emitters 138A and 140A of FIG. 1) in the image detected by the image detector, are separated by a smaller number of pixels. Therefore, a processor similar to weapon processor 126 (FIG. 1), can determine the current range of the weapon from the target, according to the separation of the representation of every pair of emitters in the image detected by the image detector, in terms of the number of pixels.

However, it is imperative to calibrate combat training system 100 before the combat training session begins, by determining the separation between the representations of a pair of emitters, when the weapon is located at a known range from the target. For this purpose a look-up table which includes a range entry and a tolerance entry, for each respective separation entry in pixels, between representations of a pair of emitters, is prepared during calibration of combat training system 100, before the combat training session begins, and the look-up table is stored in database 110.

Alternatively, target acquisition apparatus 106 may include a second image detector (not shown) in addition to image detector 128, having a different viewable distance than image detector 128. The term "viewable distance" of an image detector, as used herein, refers to a distance, wherein the image detector can clearly detect an object located in this distance, to a predetermined degree of pixel separation. For example, image detector 128 can have a viewable distance of up to several meters (e.g., ranging between approximately 1-6 meters), whereas the second image detector can have a viewable distance of up to several tens of meters (e.g., ranging between approximately 6-40 meters). The second image detector is coupled with weapon processor 126. Image detector 128 may have a larger field of view (FOV) than the second image detector, since it is employed for detecting images of targets located at smaller distances from the shooter, than the second image detector.

The second image detector acquires an image of a target, substantially simultaneously as weapon activation sensor 132 operates image detector 128 to acquire an image of that target. Thus, two images of the target are acquired, one using each of the image detectors of target acquisition apparatus 106. When the range between the target and target acquisition apparatus 106 falls within the viewable distance of image detector 128, weapon processor can identify the light emitters mounted on that target in the image, acquired by image detector 128. However, when the range between the target and target acquisition apparatus 106 falls outside the viewable distance of image detector 128, and within the viewable distance of the second image detector, weapon processor can identify the light emitters mounted on that target in the image, acquired by the second image detector. In this manner, target acquisition apparatus 106 can clearly identify targets, located at variable ranges there from, by employing a plurality of image detectors (without employing an optical zoom assembly).

It is noted, that instead of adding a second image detector, image detector 128 can be replaced with an image detector, which is divided into two sections, a narrow field of view (FOV) section and a wide FOV section. The wide FOV section is mainly focused on objects located at substantially short ranges from the weapon, and the narrow FOV section is mainly focused on objects located at substantially long ranges from the weapon.

Figure 5A:
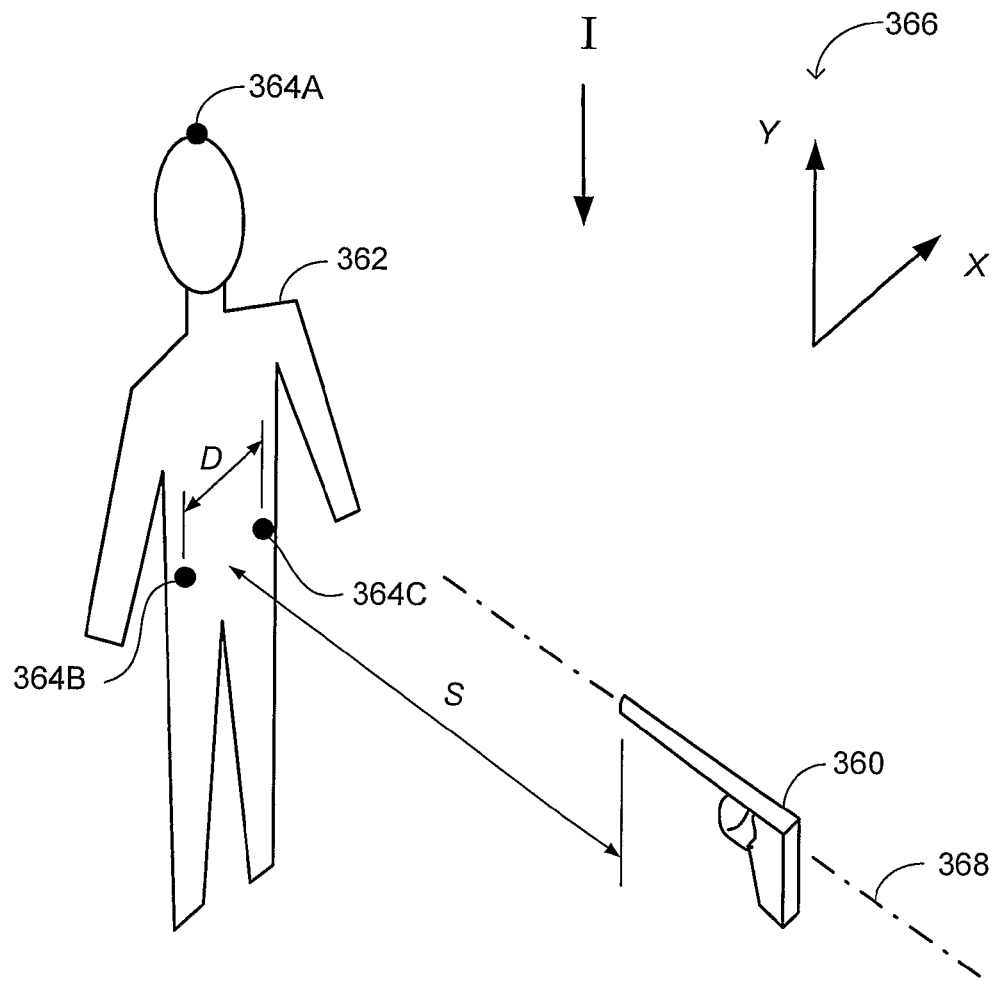
FIG. 5A is a schematic illustration in perspective, of a weapon pointing toward a target, such that a longitudinal axis of the weapon is substantially perpendicular to a plane which defines the local coordinate system of a plurality of emitters attached to the target.
Figure 5B:
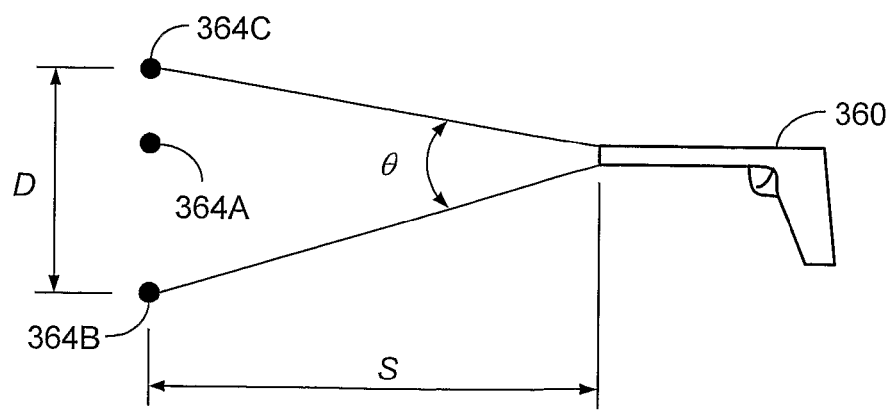
FIG. 5B is a schematic illustration of a top view of the emitters and of the weapon of FIG. 5A, for determining the viability status of the target.
Figure 6A:
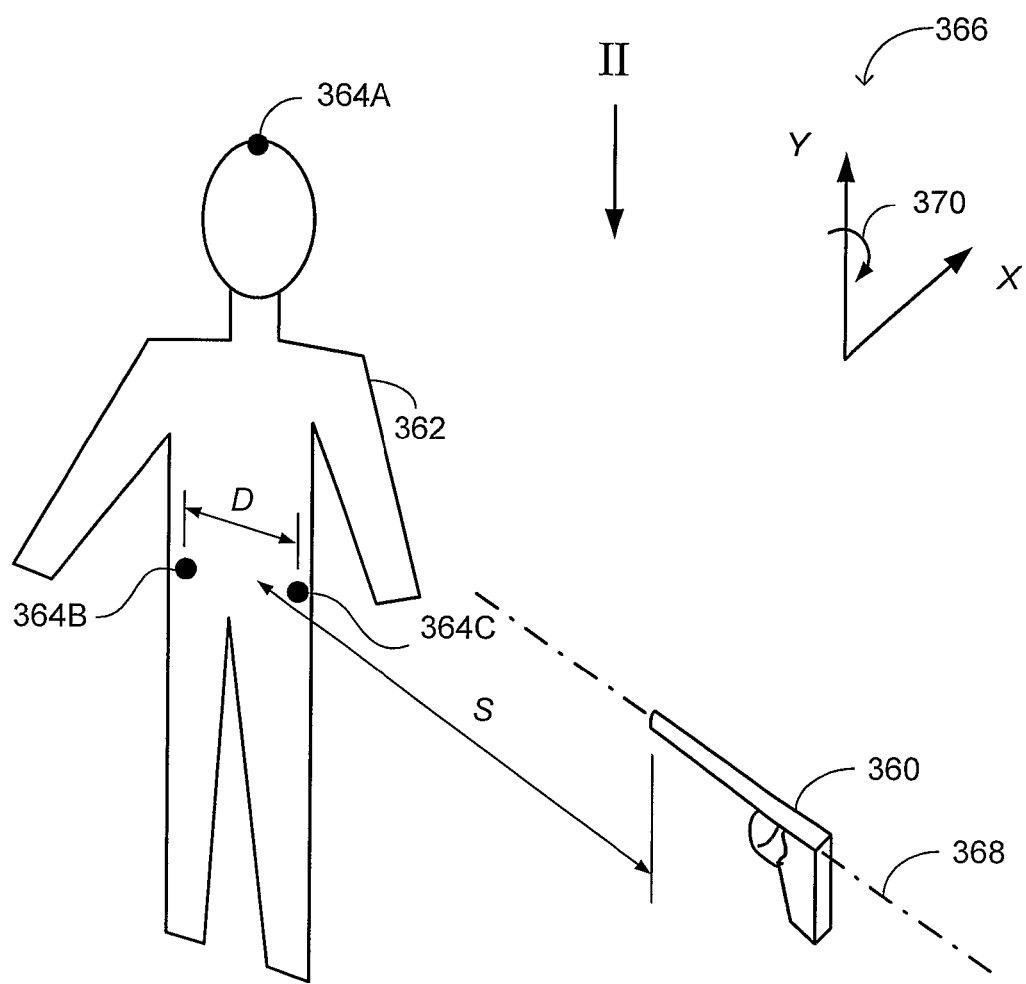
FIG. 6A is a schematic illustration of the target of FIG. 5A, rotated about the Y axis of the local coordinate system of the emitters attached to the target, with the weapon positioned in an orientation relative to the target, different than the one of FIG. 5A.
Figure 6B:
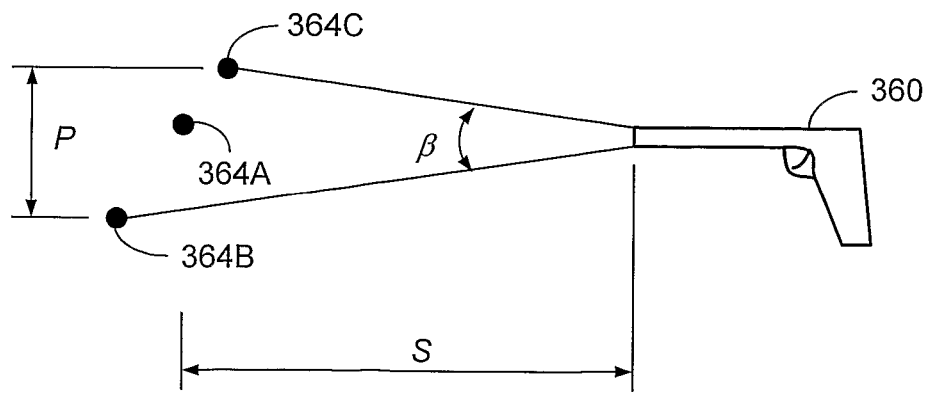
FIG. 6B is a schematic illustration of a top view of the emitters and the weapon of FIG. 6A, for determining the viability status of the target, operative according to another embodiment of the disclosed technique.

Reference is now made to FIGS. 5A, 5B, 6A, and 6B. FIG. 5A is a schematic illustration in perspective, of a weapon pointing toward a target, such that a longitudinal axis of the weapon is substantially perpendicular to a plane which defines the local coordinate system of a plurality of emitters attached to the target. FIG. 5B is a schematic illustration of a top view (view I) of the emitters and of the weapon of FIG. 5A, for determining the viability status of the target. FIG. 6A is a schematic illustration of the target of FIG. 5A, rotated about the Y axis of the local coordinate system of the emitters attached to the target, with the weapon positioned in an orientation relative to the target, different than the one of FIG. 5A. FIG. 6B is a schematic illustration of a top view (view II) of the emitters and the weapon of FIG. 6A, for determining the viability status of the target, operative according to another embodiment of the disclosed technique.

With reference to FIG. 5A, a weapon 360 is pointed toward a target 362. Target 362 is located at a range S from weapon 360. A target acquisition apparatus (not shown) similar to target acquisition apparatus 106 (FIG. 1) is coupled with weapon 360. A target platform (not shown) similar to target platform 104A is attached to target 362. Emitters 364A, 364B, and 364C, are attached to the head, the right lateral abdomen, and the left lateral abdomen, respectively, of the body of target 362. Emitters 364A, 364B, and 364C define a two-dimensional coordinate system 366. A longitudinal axis 368 of weapon 360 is substantially perpendicular to two-dimensional coordinate system 366. Emitter 364A is located on the Y axis of two-dimensional coordinate system 366, and emitters 364B and 364C are located on the X axis of two-dimensional coordinate system 366. Emitters 364B and 364C are separated by a distance D.

With reference to FIGS. 1 and 5B, weapon processor 126 determines the viability status of target 362, when a simulated shot is attempted by a shooter (not shown), from weapon 360 toward target 362, as described herein above in connection with FIG. 2C. Weapon processor 126, furthermore determines the value of range S according to the number of pixels (not shown) between representations of emitters 364B and 364C, in an image (not shown) of target 362 acquired by image detector 128, as described herein above in connection with FIG. 3B. Weapon processor 126 determines an angular separation of emitters 364B and 364C referenced by an angle $\theta$, in radians, according to the relation $\theta=\text{arctg}(D/S)$.

With reference to FIG. 6A, target 362 has rotated by a certain angle about the Y axis of two-dimensional coordinate system 366, in a direction designated by an arrow 370. Hence, longitudinal axis 368 of weapon 360 is positioned at an oblique angle (not shown) relative to the plane of two-dimensional coordinate system 366.

With reference to FIG. 6B, in a top view II of emitters 364A, 364B, and 364C, emitters 364B and 364C are separated a distance P which is less than D. However, a weapon processor (e.g., weapon processor 126 of FIG. 1) can identify two-dimensional coordinate system 366, according to the unique configuration of emitters 364A, 364B, and 364C. The separation in pixels, between representations of emitters 364B and 364C, in an image (not shown) acquired by an image detector (e.g., image detector 128 of FIG. 1), of target 362 of FIG. 6A, is less than that in an image (not shown) acquired by the image detector, of target 362 of FIG. 5A.

Due to the rotation of target 362 about the Y axis, the viable organ of target 362 rotates the angle of rotation of target 362, and the location of the viable organ in two-dimensional coordinate system 366 remains unchanged. Hence, the weapon processor can determine the viability status of target 362 as described herein above in connection with FIG. 2C. The weapon processor can furthermore determine an angular separation $\beta$ between emitters 364B and 364C, in radians, according to the relation $\beta=\text{arctg}(P/S)$, where $\beta<\theta$.

Figure 7A:
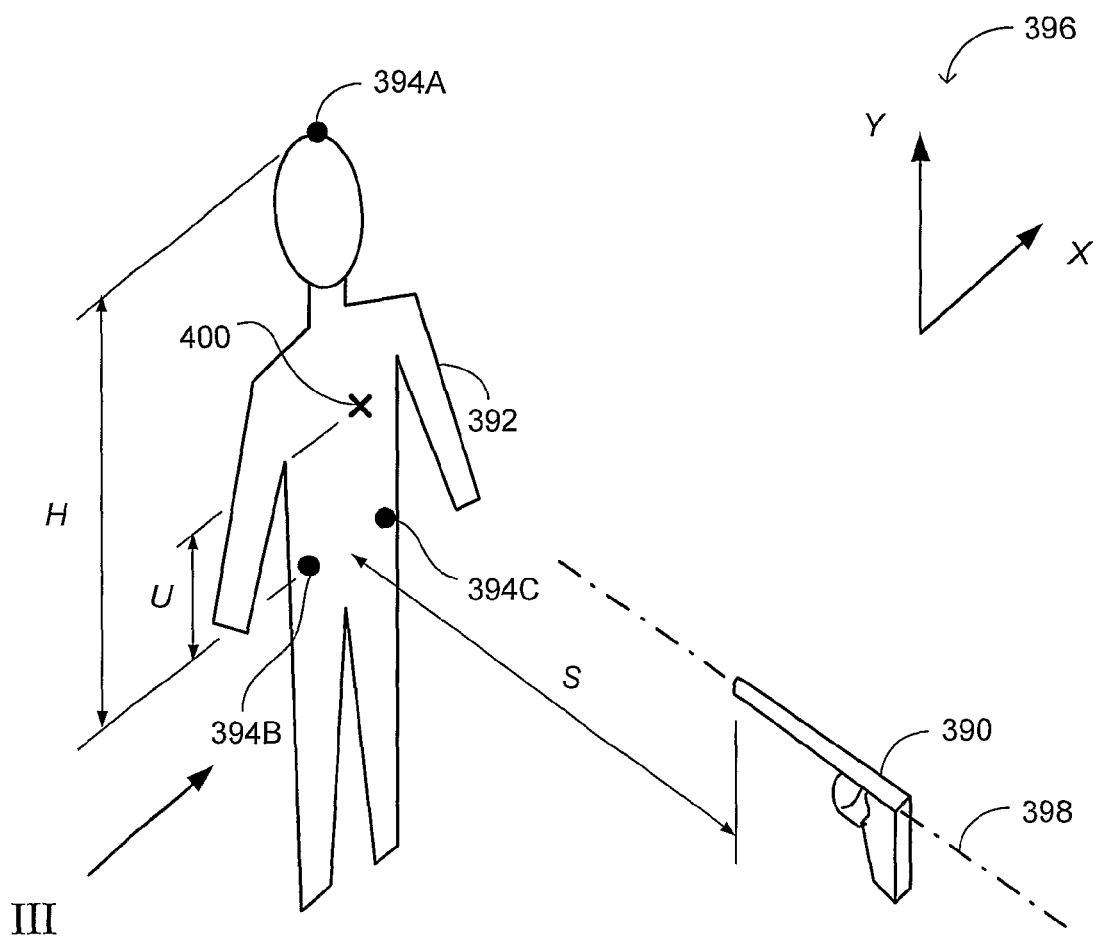
FIG. 7A is a schematic illustration in perspective, of a weapon pointing toward a target, such that a longitudinal axis of the weapon is substantially perpendicular to a plane which defines the local coordinate system of a plurality of emitters attached to the target.
Figure 7B:
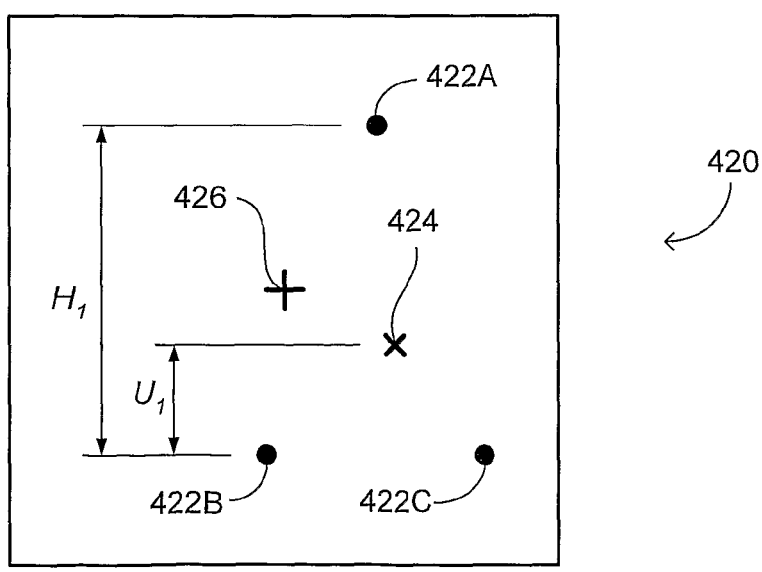
FIG. 7B is a schematic illustration of an image of the emitters which are attached to the target of FIG. 7A, as acquired by the image detector of the combat training system of FIG. 1, along the longitudinal axis of the weapon.
Figure 7C:
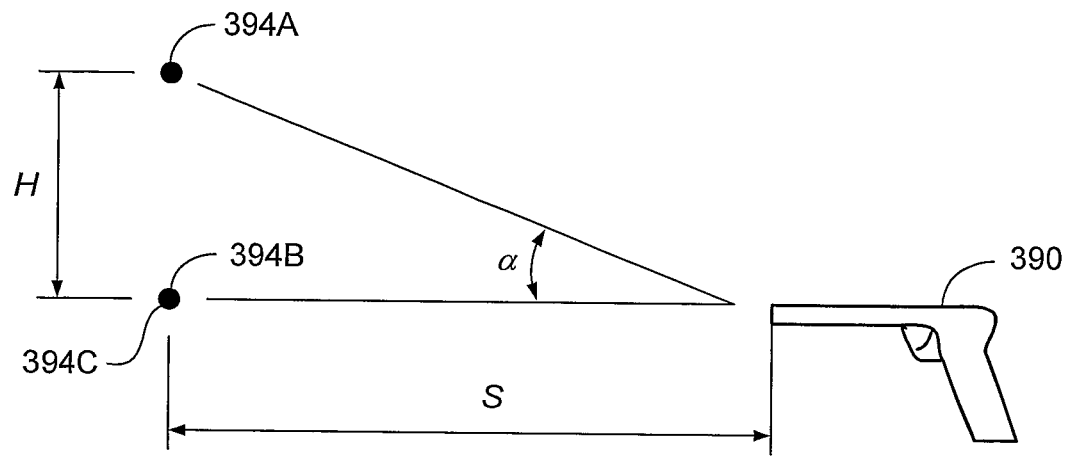
FIG. 7C is a schematic illustration of a side view of the emitters of FIG. 7A.
Figure 8C:
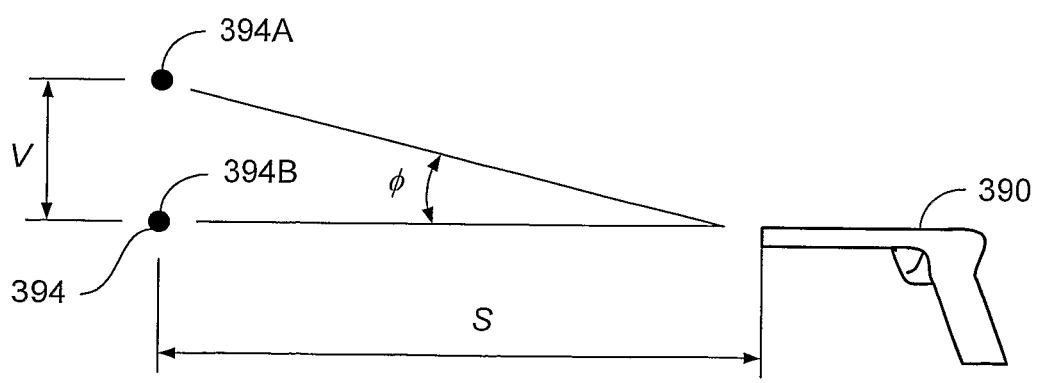
FIG. 8C is a schematic illustration of a side view of the emitters which are attached to the target of FIG. 8A.
Figure 8A:
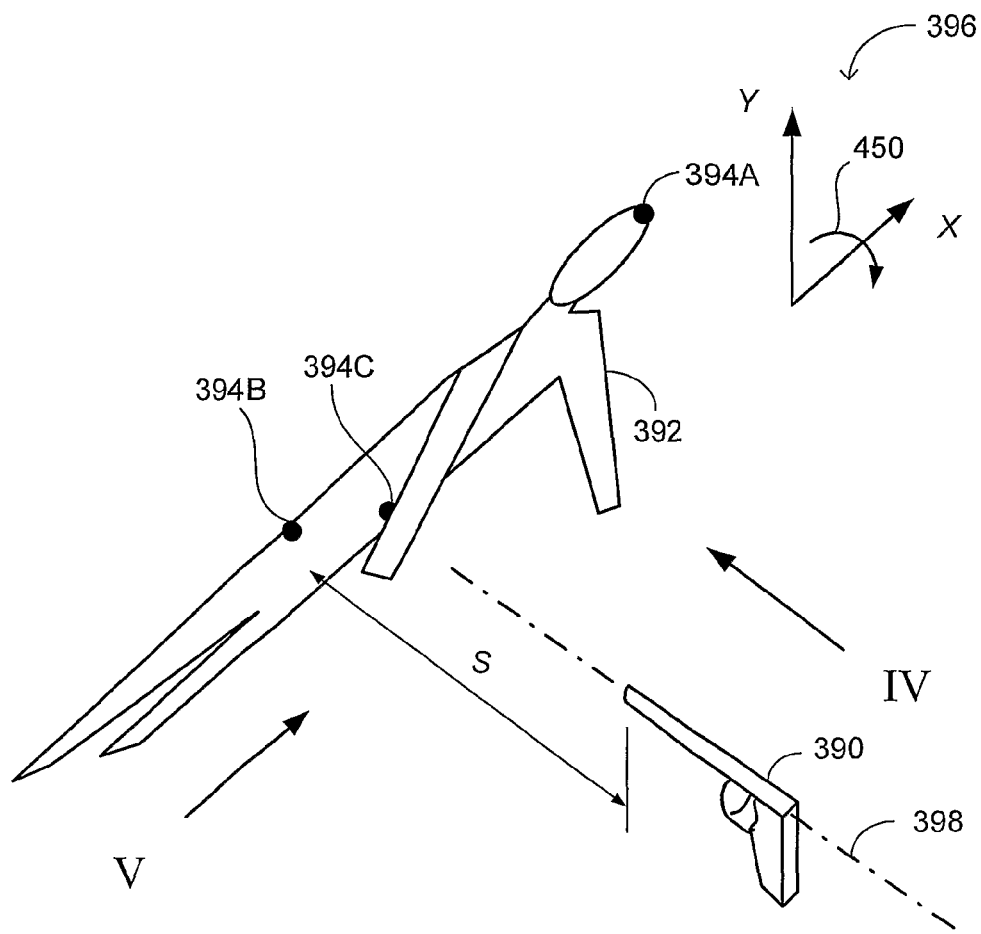
FIG. 8A is a schematic illustration of the target of FIG. 7A, rotated about the X axis of the local coordinate system of the emitters which are attached to the target of FIG. 7A, with the weapon positioned in an orientation relative to the target, different than the one of FIG. 7A.
Figure 8B:
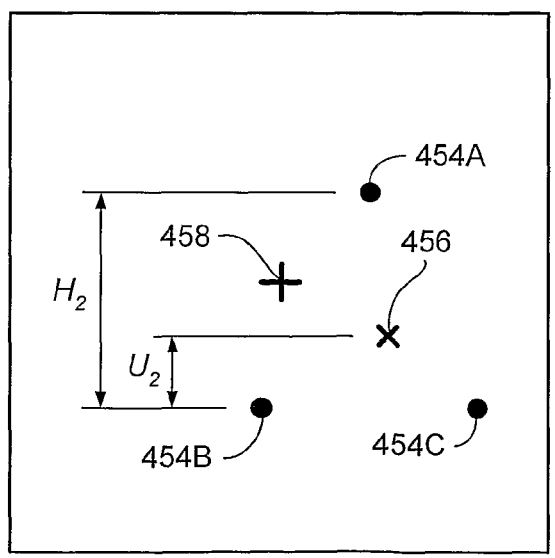
FIG. 8B is a schematic illustration of an image of the emitters which are attached to the target of FIG. 8A, as acquired by the image detector of the combat training system of FIG. 1, the image being acquired along an aiming direction of the weapon of FIG. 8A, the image being employed for determining the viability status of the target, operative according to a further embodiment of the disclosed technique.

Reference is now made to FIGS. 7A, 7B, 7C, 8A, 8B, and 8C. FIG. 7A is a schematic illustration in perspective, of a weapon pointing toward a target, such that a longitudinal axis of the weapon is substantially perpendicular to a plane which defines the local coordinate system of a plurality of emitters attached to the target. FIG. 7B is a schematic illustration of an image of the emitters which are attached to the target of FIG. 7A, as acquired by the image detector of the combat training system of FIG. 1, along the longitudinal axis of the weapon. FIG. 7C is a schematic illustration of a side view (view III) of the emitters of FIG. 7A. FIG. 8A is a schematic illustration of the target of FIG. 7A, rotated about the X axis of the local coordinate system of the emitters which are attached to the target of FIG. 7A, with the weapon positioned in an orientation relative to the target, different than the one of FIG. 7A. FIG. 8B is a schematic illustration of an image of the emitters which are attached to the target of FIG. 8A, as acquired by the image detector of the combat training system of FIG. 1, the image being acquired along an aiming direction of the weapon of FIG. 8A (view IV), the image being employed for determining the viability status of the target, operative according to a further embodiment of the disclosed technique. FIG. 8C is a schematic illustration of a side view (view V) of the emitters which are attached to the target of FIG. 8A.

With reference to FIG. 7A, a weapon 390 is pointed toward a target 392. Target 392 is located at a range S from weapon 390. A target acquisition apparatus (not shown) similar to target acquisition apparatus 106 (FIG. 1) is coupled with weapon 390. A target platform (not shown) similar to target platform 104A is attached to target 392. Emitters 394A, 394B, and 394C, are attached to the head, the right lateral abdomen, and the left lateral abdomen, respectively, of the body of target 392. Emitters 394A, 394B, and 394C define a two-dimensional coordinate system 396. A longitudinal axis 398 of weapon 390 is substantially perpendicular to two-dimensional coordinate system 396. Emitter 394A is located on the Y axis of two-dimensional coordinate system 396, and emitters 394B and 394C are located on the X axis of two-dimensional coordinate system 396.

Emitter 394A is separated from emitters 394B and 394C, by a distance H along the Y axis of two-dimensional coordinate system 396. A viable organ 400 of target 392 is located at a distance U from emitters 394B and 394C, along the Y axis of two-dimensional coordinate system 396. The proportionality constant of these two distances is C=U/H.

With reference to FIG. 7B, an image 420 acquired by image detector 128 (FIG. 1) from target 392, includes representations 422A, 422B, and 422C of emitters 394A, 394B, and 394C, respectively, and crosses 424 and 426 representative of a viable organ 400, and of a center of image 420, respectively. Representation 422A of emitter 394A is vertically separated by a number of pixels $H_1$ from representations 422B and 422C of emitters 394B and 394C, respectively. Cross 424 is vertically separated by a number of pixels $U_1$ from representations 422B and 422C of emitters 394B and 394C, respectively. The numerical relation of these two distances is $C=U_1/H_1$. Hence, weapon processor 126 (FIG. 1) can determine the viability status of target 392 by processing image 420, as described herein above in connection with FIG. 2C.

With reference to FIG. 8A, target 392 has rotated by a certain angle about the X axis of two-dimensional coordinate system 396, in a direction designated by an arrow 450. Hence, longitudinal axis 398 of weapon 390 is positioned at an oblique angle (not shown) relative to the plane of two-dimensional coordinate system 396.

With reference to FIG. 8B, an image 452 acquired by image detector 128 (FIG. 1) from target 392, includes representations 454A, 454B, and 454C of emitters 394A, 394B, and 394C, respectively, and crosses 456 and 458 representative of viable organ 400 and of a center of image 452, respectively. Representation 454A of emitter 394A is vertically separated by a number of pixels $H_2$ from representations 454B and 454C of emitters 394B and 394C, respectively. Cross 456 is vertically separated by a number of pixels $U_2$ from representations 454B and 454C of emitters 394B and 394C, respectively. The numerical relation of these two distances is $C=U_2/H_2$. Weapon processor 126 (FIG. 1) determines the value of proportionality constant C as described herein above in connection with FIG. 7B. Hence, weapon processor 126 can determine the viability status of target 392, even in the position as depicted in FIG. 8A, by processing image 452, as described herein above in connection with FIG. 2C.

Weapon processor 126, can furthermore determine the orientation of target 392 relative to a global coordinate system (not shown), in which the coordinates of emitters 394A, 394B, and 394C, and the aiming direction of weapon 390 are defined. For this purpose, data respective of target 392 is stored in database 110, during calibration of combat training system 100, before the combat training session begins. Such data can be, for example, the spatial configuration of emitters 394A, 394B, and 394C, the contour of the body of target 392, as well as the coordinates of different vital items of the body of target 392, in a selected orientation of target 392, relative to the global coordinate system.

With reference to FIG. 7C, emitter 394A is separated from emitters 394B and 394C, by the distance H along a plane (not shown) substantially normal to the X,Y plane of two-dimensional coordinate system 396, and along the Y axis of two-dimensional coordinate system 396. Weapon processor 126 determines the viability status of target 392, when a simulated shot is attempted by a shooter (not shown), from weapon 390 toward target 392, as described herein above in connection with FIG. 2C. Weapon processor 126, furthermore determines the value of range S according to the number of pixels $H_1$ (FIG. 7B) between representation 422A of emitter 394A and representations 422B and 422C of emitters 394B and 394C, respectively, of image 420, as described herein above in connection with FIG. 3B. Weapon processor 126 determines an angular separation of emitter 394A from either of emitters 394B and 394C, referenced by an angle α, in radians, according to the relation α=arctg(H/S).

With reference to FIG. 8C, emitter 394A is separated from emitters 394B and 394C, by a distance V along a plane (not shown) substantially normal to the X,Y plane of two-dimensional coordinate system 396, and along the Y axis of two-dimensional coordinate system 396, where V<H. Weapon processor 126 determines the viability status of target 392, when a simulated shot is attempted by a shooter (not shown), from weapon 390 toward target 392, according to the relation $C=U_2/H_2$, and as described herein above in connection with FIGS. 8B and 2C. Weapon processor 126, furthermore determines the value of range S according to the number of pixels $H_2$ (FIG. 8B) between representation 454A of emitter 394A and representations 454B and 454C of emitters 394B and 394C, respectively, of image 452, as described herein above in connection with FIG. 3B. Weapon processor 126 determines an angular separation of emitter 394A from either of emitters 394B and 394C, referenced by an angle φ, in radians, according to the relation φ=arctg(V/S).

Figure 9A:
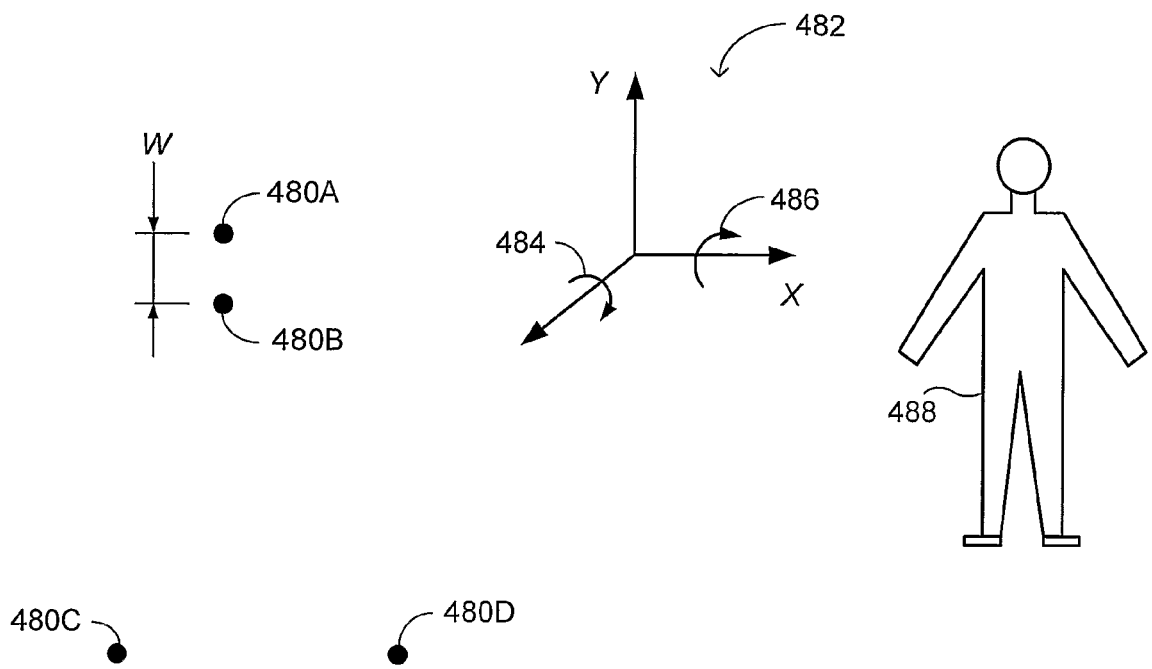
FIG. 9A is a schematic illustration of a spatial configuration of a plurality of emitters, attached to a target who takes part in a combat training session, which employs the combat training system of FIG. 1, the spatial configuration being characterized according to another embodiment of the disclosed technique.
Figure 9B:
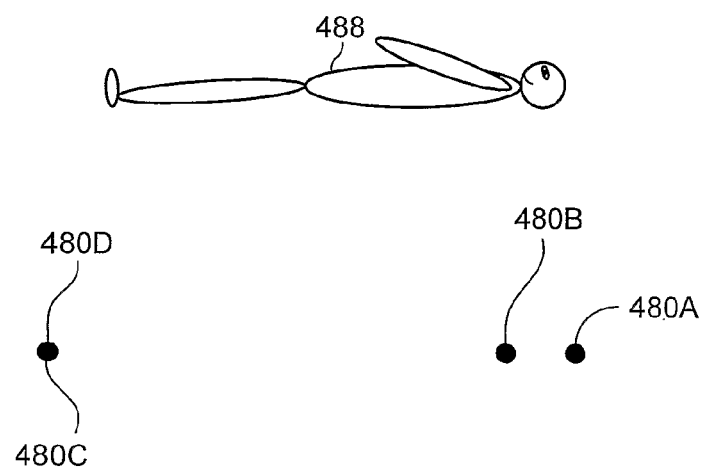
FIG. 9B is a schematic illustration of the emitters of FIG. 9A, when the target of FIG. 9A has rotated about an axis substantially normal to the X, Y plane of a two-dimensional local coordinate system defined by the emitters, and further rotated about the X axis of this local two-dimensional coordinate system.

Reference is now made to FIGS. 9A and 9B. FIG. 9A is a schematic illustration of a spatial configuration of a plurality of emitters, attached to a target who takes part in a combat training session, which employs the combat training system of FIG. 1, the spatial configuration being characterized according to another embodiment of the disclosed technique. FIG. 9B is a schematic illustration of the emitters of FIG. 9A, when the target of FIG. 9A has rotated about an axis substantially normal to the X,Y plane of a two-dimensional local coordinate system defined by the emitters, and further rotated about the X axis of this local two-dimensional coordinate system.

With reference to FIG. 9A, emitters 480A and 480B are attached to the head of target 488, and emitters 480C and 480D are attached to the right shoulder and the left shoulder of target 488, respectively, of the target. Emitters 480A, 480B, 480C, and 480D define a two-dimensional coordinate system 482. Emitters 480A and 480B are separated by a distance W along the vertical axis Y of two-dimensional coordinate system 482. Target 488 can be considered as standing in a vertical position, such that all of emitters 480A, 480B, 480C, and 480D are distinguishable.

With reference to FIG. 9B, the target has rotated about an axis substantially perpendicular to the X, Y plane of two-dimensional coordinate system 482, in a direction designated by an arrow 484, and further rotated about the X axis of two-dimensional coordinate system 482, in a direction designated by an arrow 486. Thus, target 488 can be considered as lying down in a horizontal position, such that emitters 480A and 480B are distinguishable, while emitters 480C and 480D are not distinguishable, and have only one representation. Weapon processor 126 (FIG. 1) can identify two-dimensional coordinate system 482, according to the spatial configuration of emitters 480A, 480B, 480C, and 480D, as illustrated in FIG. 9A, to determine various parameters, such as the viability status of the target after a simulated shot is attempted thereat, as described herein above in connection with FIG. 2C, and the like.

Figure 10A:
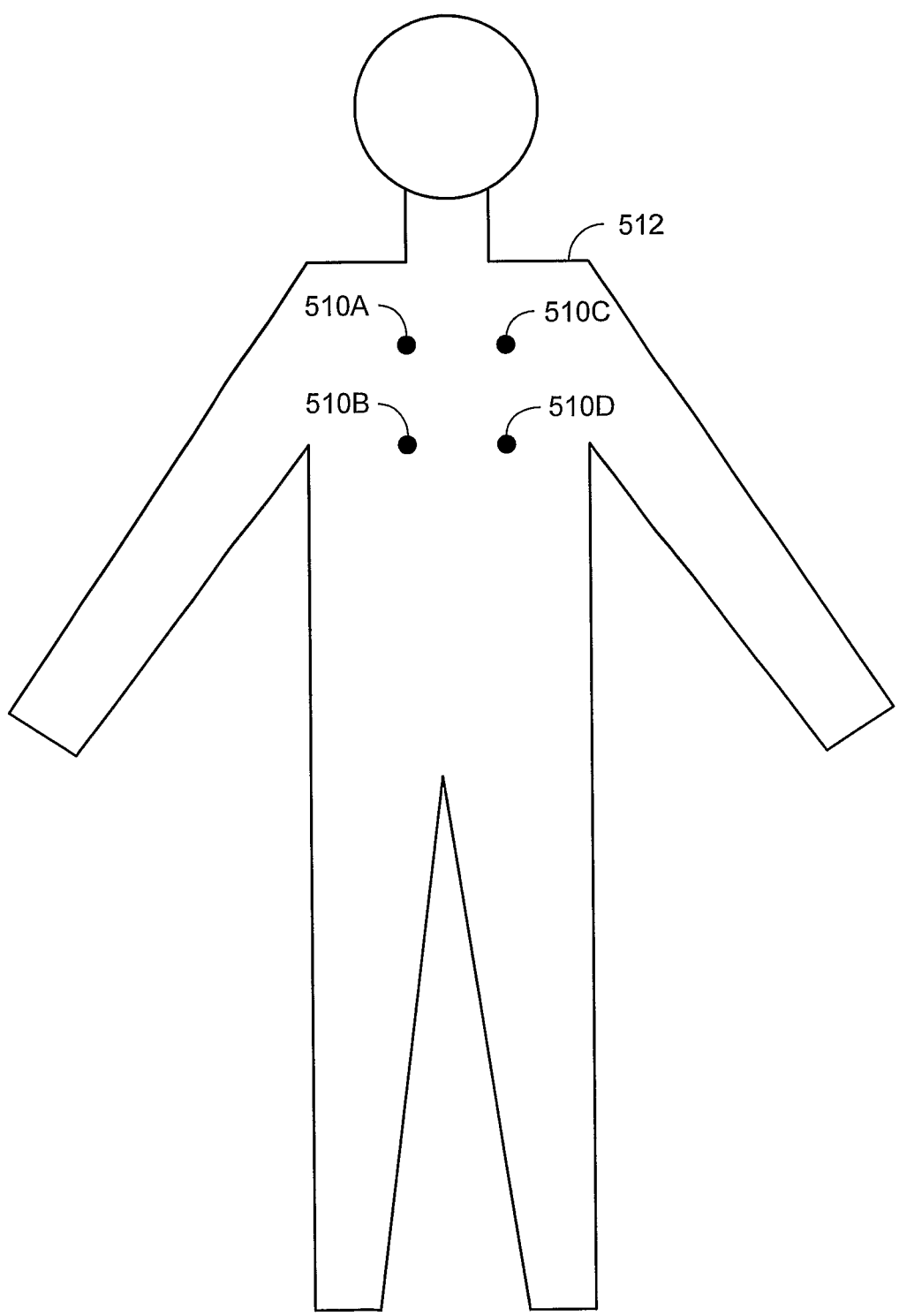
FIG. 10A is a schematic illustration of a spatial configuration of a plurality of emitters attached to the body of a target, participating in a combat training session, which employs the combat training system of FIG. 1, the spatial configuration being characterized according to a further embodiment of the disclosed technique.
Figure 10B:
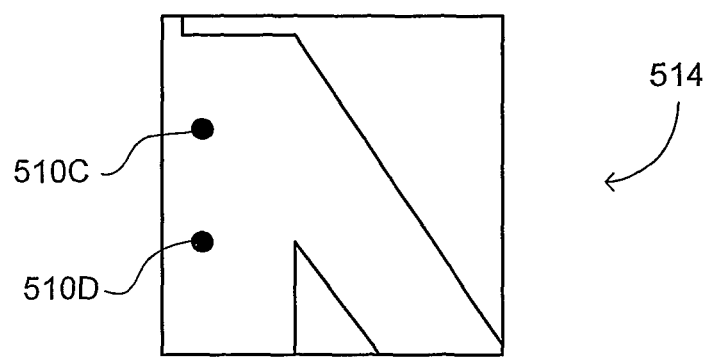
FIG. 10B is a schematic illustration of an image of the target of FIG. 10A, acquired by the image detector of the target acquisition apparatus of the combat training system of FIG. 1, wherein the image includes representations of a portion of the emitters of FIG. 10A.

Reference is now made to FIGS. 10A, and 10B. FIG. 10A is a schematic illustration of a spatial configuration of a plurality of emitters attached to the body of a target, participating in a combat training session, which employs the combat training system of FIG. 1, the spatial configuration being characterized according to a further embodiment of the disclosed technique. FIG. 10B is a schematic illustration of an image of the target of FIG. 10A, acquired by the image detector of the target acquisition apparatus of the combat training system of FIG. 1, wherein the image includes representations of a portion of the emitters of FIG. 10A.

With reference to FIG. 10A, emitters 510A, 510B, 510C, and 510D are attached to the torso of a target 512, in a square configuration. With reference to FIGS. 1 and 10B, an image 514 acquired from target 512 by image detector 128, includes representations 516C and 516D of only emitters 510C and 510D, respectively. Weapon processor 126 can identify the square configuration of emitters 510A, 510B, 510C, and 510D, according to the configuration of representations 516C and 516D, exclusively, due to the redundancy of the square configuration. Since the memory unit of weapon processor 126 stores the spatial configuration of each group of emitters, processor 126 can deduce the configuration according to a partial representation of the group of emitters (e.g., by extrapolation of the partial representation to achieve the complete configuration).

Additionally or alternatively, when acquired image 514 includes a partial representation of the spatial configuration of the light emitters, weapon processor 126 can retrieve a previous image of target 512, acquired shortly prior to image 514 (i.e., from the memory unit thereof). For example, weapon processor 126 retrieves a previous image of target 512, acquired five seconds before acquiring image 514. Weapon processor 126 can alternatively retrieve a series of previous images of target 512, acquired in predetermined time intervals (e.g., one second) before acquiring image 514. When the previous image (or images) includes a full representation of the spatial configuration of the light emitters, weapon processor 126 can use this image to determine the local coordinate system defined by the emitters. Weapon processor 126 then assumes that target 512 has not changed its position substantially between the acquisition of the previous image and of image 514. According to the position of target 512 in the previous images, weapon processor 126 can estimate the current position of target 512. Based on this estimation of the current position of target 512, weapon processor 126 determines the viability status of target 512. Weapon processor can also assess the accuracy of determining the viability status of target 512, according to estimation of the current position of target 512.

Additionally or alternatively, weapon processor 126 can store a three-dimensional (3D) model of target 512 and the light emitters mounted thereon, in the memory thereof, before the combat training session begins. Weapon processor 126 can retrieve the 3D model of target 512, and compare the partial representation of the spatial configuration of the light emitters, with the stored 3D model. According to the stored 3D model of target 512, weapon processor 126 can estimate the current position of target 512. Based on this estimation, weapon processor 126 determines the viability status of target 512.

Figure 11:
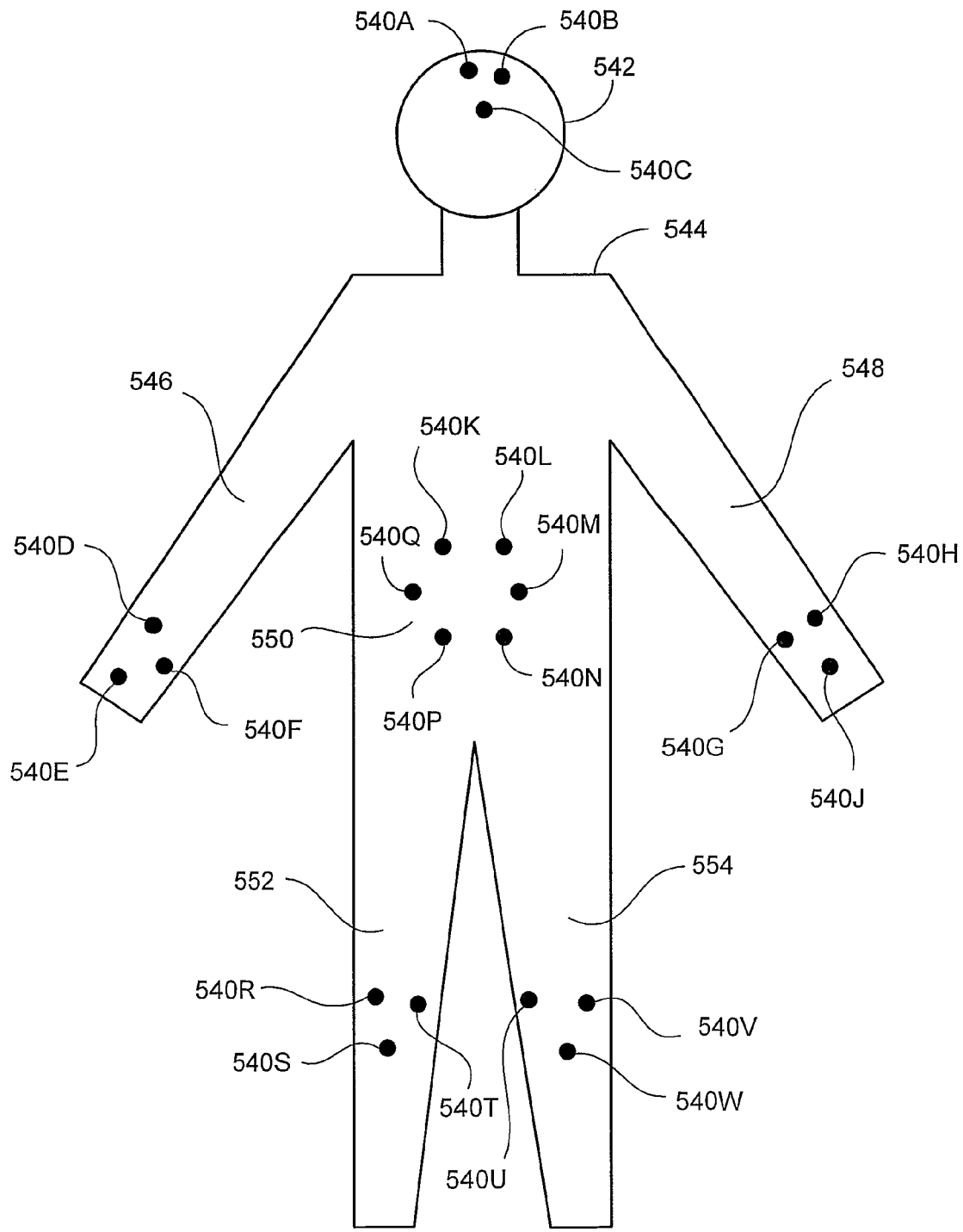
FIG. 11 is a schematic illustration of a plurality of emitters attached to different portions of the anterior portion of the body of a target participating in a combat training session employing the combat training system of FIG. 1.

Reference is now made to FIG. 11, which is a schematic illustration of a plurality of emitters attached to different portions of the anterior portion of the body of a target participating in a combat training session employing the combat training system of FIG. 1. Each group of emitters at each portion of the body of the target is arranged in a different configuration, according to another embodiment of the disclosed technique. Emitters 540A, 540B, and 540C are attached to a head 542 of a target 544, emitters 540D, 540E, and 540F are attached to a right arm 546 of target 544, emitters 540G, 540H, and 540J are attached to a left arm 548 of target 544, emitters 540K, 540L, 540M, 540N, 540P, and 540Q are attached to an abdomen 550 of target 544, emitters 540R, 540S, and 540T are attached to a right leg 552 of target 544, and emitters 540U, 540V, and 540W are attached to a left leg 554 of target 544.

Each group of emitters at each portion to the body of target 544 (i.e., head 542, right arm 546, left arm 548, abdomen 550, right leg 552, and left leg 554), are arranged in a different spatial configuration, defining a respective local coordinate system. Hence, weapon processor 126 (FIG. 1) can identify a respective portion of the body of target 544, according to the specific spatial configuration of the respective group of emitters, in an image (not shown) acquired by image detector 128, from that portion of the body of target 544.

Additionally, other groups of emitters (not shown) can be attached to different portions of the posterior portion of the body of target 544, in configurations different than those of the anterior portion of the body of target 544. In this case, weapon processor 126 can distinguish between the anterior portions and the posterior portions the body of target 544.

Additionally or alternatively, modulation controller 134A can modulate the light emission of each group of emitters, attached to the respective portion of the body of target 544, differently (i.e., provide temporal configuration diversity). For example, modulation controller 134A can direct emitters 540A, 540B, and 540C to blink at a frequency of 1015 Hz (or according to a blinking pattern representing a code 1015), and emitters 540D, 540E, and 540F to blink at a frequency of 1025 Hz (or according to a blinking pattern representing a code 1025). In this case, weapon processor 126 can distinguish between head 542 and right arm 546, according to the respective output of modulated light detector 130. Weapon processor 126 identifies each group of emitters, and the respective portion of the body of target 544, to which these emitters are attached, by comparing the modulation characteristics of each detected emitter (or group of emitters) with data stored in the memory unit of weapon processor 126.

Figure 12A:
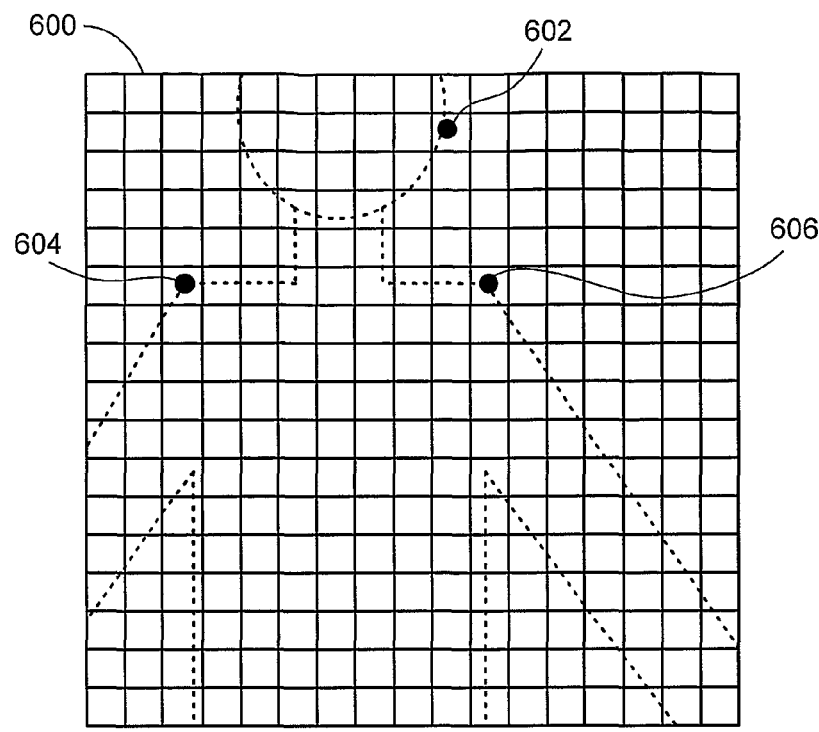
FIG. 12A is a schematic illustration of a modulation image, detected by the modulated light detector of the target acquisition apparatus of the combat training system of FIG. 1, operative according to another embodiment of the disclosed technique.
Figure 12B:
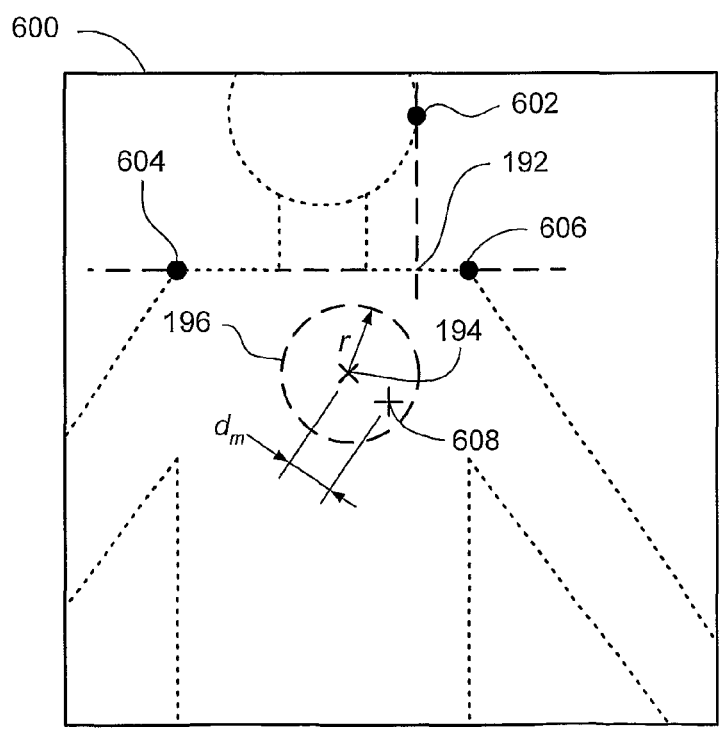
FIG. 12B is a schematic illustration of the modulation image of FIG. 12A, including a representation of a shot located within the hit region of FIG. 2B.

Reference is further made to FIGS. 12A and 12B. FIG. 12A is a schematic illustration of a modulation image, generally referenced 600, detected by the modulated light detector of the target acquisition apparatus of the combat training system of FIG. 1, operative according to another embodiment of the disclosed technique. FIG. 12B is a schematic illustration of the modulation image of FIG. 12A, including a representation of a shot located within the hit region of FIG. 2B.

With reference to FIGS. 1, 2A and 12A, modulated light detector 130 is formed of a matrix of modulation detecting elements. Each of these modulation detecting elements detects the modulation of light impinging thereon. Modulation image 600 is composed of a plurality of cells, similarly to the pixels of an image detected by image detector 128 of FIG. 1 (e.g., image 284 of FIG. 3B). It is noted, that the lines depicting these cells in FIG. 12A, are excluded from FIG. 12B, for the purpose of clarity.

When the shooter simulates a shot using the associated weapon, weapon activation sensor 132 produces a triggering signal to activate modulation detector 130 (either via weapon processor 126 or directly) to detect light emitted by each of emitters 136A, 138A and 140A. Modulation image 600 includes a representation of emitters 136A, 138A and 140A, designated by dots 602, 604 and 606, respectively. It is noted, that modulation image 600 is detected when modulated light detector 130 is operative for a period of time, sufficient to determine the modulation characteristic of light emitted by emitters 136A, 138A and 140A. Such time period can range, for example, between 10-30 milliseconds.

Before the combat training session begins, modulated light detector 130 is registered with the weapon, in the following manner. The shooter aims the weapon at a calibration light source (not shown). The calibration light source emits modulated light, having a modulation characteristic substantially different than of the emitters included in each of the target platforms (e.g., 104A or 104B) of combat simulation system 100. The shooter aligns the weapon sight with the calibration light source, operates the weapon so as to shoot, thereby activating modulated light detector 130. Since the line of sight of modulated light detector 130 is substantially aligned with the aiming direction of the weapon, the light emitted by the calibration light source is detected by at least one detecting element of modulated light detector 130. Weapon processor 126 registers this detecting element as the hit location of a shot simulated by modulated light detector 130. This hit location is designated as cross 608, located substantially at the center of modulation image 600. It is noted, that the hit location can be registered at an off-centered detecting element, depending on the aiming precision of the shooter and on the physical alignment of modulated light detector 130 relatively to the weapon.

The light from each of emitters 136A, 138A and 140A is detected by separate detecting elements of modulated light detector 130. It is noted, that modulated light detector 130 only detects invisible light emitted by emitters 136A, 138A and 140A. Thus, the representation of the contour of target 170, depicted in dotted lines, is not detected by modulated light detector 130, and is not included in modulation image 600. This contour is depicted for explanation purposes only.

With reference to FIGS. 1, 2A, 2B, and 12B, weapon processor 126 processes modulation image 600 to identify coordinate system 190, according to the configuration of dots 602, 604 and 606. Weapon processor 126 determines the coordinates of origin 192 of coordinate system 190 relative to cross 608, representing the hit location of the shot simulated by scene 600. Accordingly, weapon processor 126 determines the coordinates of hit region 196 of viable organ 194, in coordinate system 190. Weapon processor 126 determines a distance $d_m$ between the coordinates of hit location (i.e., cross 608) and the coordinates of viable organ 194. In the example set forth in FIG. 12B, the distance $d_m$ is equal to or less than the radius r of hit region 196. Therefore, weapon processor 126 determines that the simulated shot fired by the weapon coupled with target acquisition apparatus 106, has hit viable organ 194, and accordingly produces viability status data respective of target 170.

It is noted, that when a matrix modulated light detector is used (such as in the example set forth in FIG. 12A), modulated light detector 130 can distinguish between different emitters having different modulation characteristics, even if the emitters are simultaneously detected in the same simulated shot. Since each detecting element of modulated light detector 130 independently detects the modulation characteristic of light radiation impinging thereon, different detecting elements can detect different emitters in the same modulation image. Weapon processor 126 can then determine the identity of the targets associated with all the detected emitters, and analyze the consequences of the simulated shot with regard to these targets.

It is further noted, that according to the example set forth in FIGS. 12A and 12B, target acquisition apparatus 106 can operate using only modulated light detector 130, while image detector 128 is optional, or used for back-up or documentation purposes only.

Figure 13A:
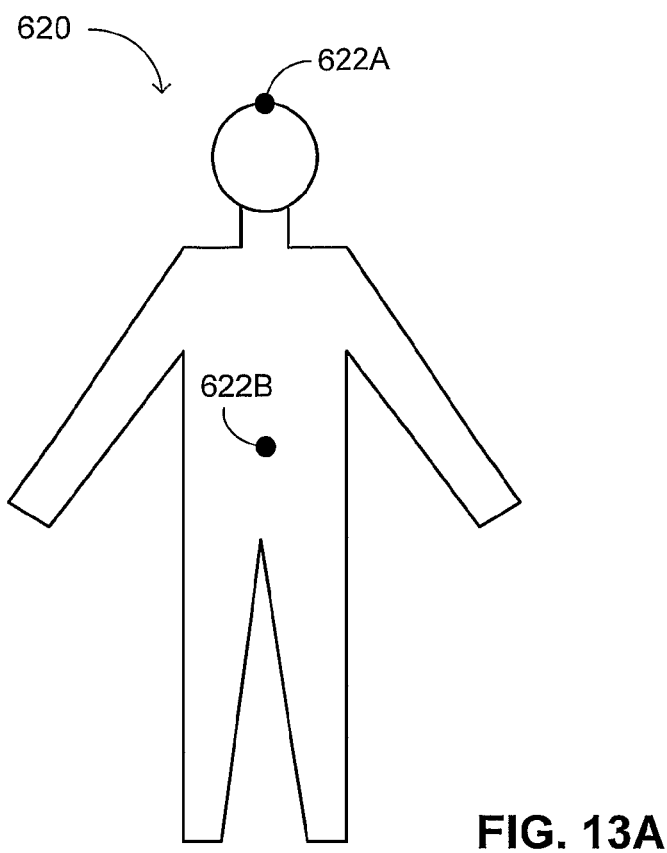
FIG. 13A is a schematic illustration of a target, associated with a combat training system, operative according to a further embodiment of the disclosed technique.
Figure 13B:
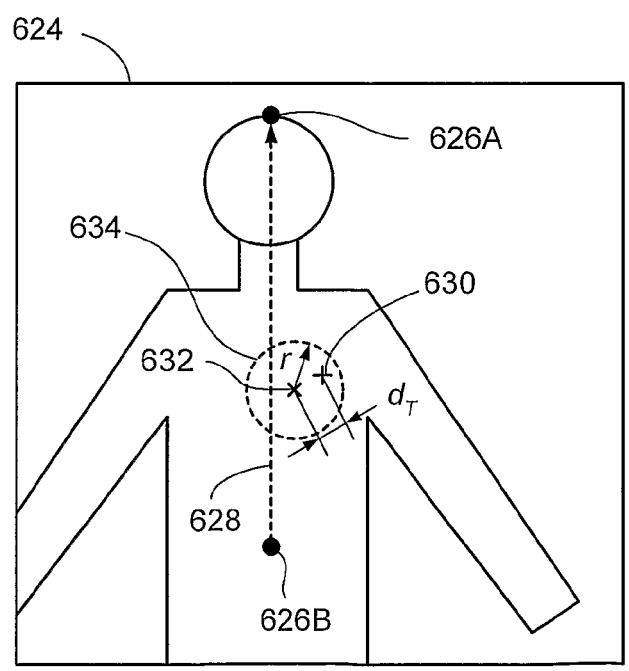
FIG. 13B is a schematic illustration of an image acquired by the image detector of the target acquisition apparatus of a combat training system, which includes a representation of a shot located within the hit region of the target of FIG. 13A.

Reference is further made to FIGS. 13A and 13B. FIG. 13A is a schematic illustration of a target, generally referenced 620, associated with a combat training system, constructed and operative according to a further embodiment of the disclosed technique. FIG. 13B is a schematic illustration of an image acquired by the image detector of the target acquisition apparatus of a combat training system, which includes a representation of a shot located within the hit region of the target of FIG. 13A. Target 620 is associated with a combat training system (not shown), which is similar to combat training system 100 of FIG. 1.

Target 620 is associated with a target platform, similar to target platform 104A of FIG. 1. The light emitter assembly of the target platform includes two emitters, 622A and 622B (instead of at least three, as described herein above with reference to FIG. 1). Emitter 622A is attached to the head of target 620 and emitter 622A to the center of the abdomen thereof. Emitters 622A and 622B define a one-dimensional local coordinate system, such that a line drawn between a representation of emitters 622A and 622B defines a directional vector. Each of emitters 622A and 622B emits light having a unique modulation characteristic, such that both emitters are distinguishable according to their respective modulation characteristics.

With reference to FIG. 13B, an image detector of a target acquisition apparatus of the target acquisition apparatus acquires image 624 of at least a portion of target 620. A center of image 624 is represented by a cross 630. The main processor of the combat training system registers the coordinates of each of the viable organs of target 620 (e.g., viable organ 632), with the directional vector defined by emitters 622A and 622B. Image 624 includes a representation of emitters 622A and 622B, designated by dots 626A and 626B. A directional vector 628 is defined between dots 626A and 626B, its direction pointing from dot 626B toward dot 626A.

The weapon processor processes image 624 to identify directional vector 628, according to the configuration of dots 626A and 626B. The weapon processor determines the coordinates of viable organ 632 relative to center 630 of image 624. Accordingly, the weapon processor determines the coordinates of a hit region 634 of viable organ 632, relative to directional vector 628. The weapon processor determines a distance $d_T$ between the coordinates of center 630 of image 624 (i.e., the cross within the viewer of the weapon) and the coordinates of viable organ 632. In the example set forth in FIG. 13B, the distance $d_T$ is equal to or less than the radius r of hit region 634. Therefore, the weapon processor determines that a simulated shot fired by the weapon, has hit viable organ 632, and accordingly produces viability status data respective of target 620. The weapon processor then performs further actions, as described herein above with reference to FIGS. 1, 2A, 2B and 2C. It is noted, that when the light emitter assembly includes three emitters, the accuracy of determining the viability status of target 624 is improved, compared to when the light emitter assembly includes two emitters.

Reference is now made to FIGS. 14A and 14B. FIG. 14A is a schematic illustration of a side view of a target identification (ID) matrix, generally referenced 650, according to another embodiment of the disclosed technique. FIG. 14B is a schematic illustration of a front view of the target ID matrix of FIG. 14A. Target ID matrix 650 can be used as a light emitter assembly, incorporated in a target platform of a combat training system (such as combat training system 100 of FIG. 1). The light emitted from target ID matrix 650 can be uniquely encoded (similarly to the unique modulation characteristic of the light emitters of FIG. 1) to distinguish between the plurality of targets of the combat training system.

Target ID matrix 650 includes a light source 658, an infrared filter 660, a window 652 and an orientation mark 656. Infrared filter 660 is located between window 652 and light source 658. Orientation mark 656 is located below window 652, parallel to a bottom side of window 652. Light source 658 can be a lamp, emitting light at visible wavelengths as well as at infrared wavelengths (e.g., a halogen lamp). Infrared filter 660 filters the light emitted from light source 658, such that only light at infrared wavelengths (and no light at visible wavelengths) passes from light source 658 toward window 652. Alternatively, light source 658 can be an infrared lamp, or a plurality of infrared lamps or LEDs (e.g., a LED behind each aperture), emitting light at infrared wavelengths and no light at visible wavelengths. In such a case, infrared filter 660 can be omitted. Orientation mark 656 can be painted with a color detectable by the image detector of the combat training system, for marking the bottom of target ID matrix 650. Alternatively, orientation mark 656 may be located adjacent a corner of window 652, marking that corner and thus the orientation of window 652. For example, orientation mark 656 can be a painted mark, located adjacent to the lower left corner of window 652. Target ID matrix 650 can further include a light diffuser (not shown), located in front of window 652, to diffuse light passing through window 652. Target ID matrix 650 can further include a sticker layer of adhesive material, on the back side thereof (i.e., behind light source 658), allowing attachment of target ID matrix 650 to a surface of the respective target (e.g., cloth, plastic, metal, and the like).

Window 652 is constructed of transparent material, allowing light rays to pass there through. A plurality of apertures divides the face of window 652. In FIG. 14B, the shape of window 652 is a square, and it is divided into sixteen square apertures (i.e., four rows of four squares), designated by numerals $654_0$, $654_1$, $654_2$ ... $654_{15}$. Each of apertures $654_0$-$654_{15}$ can either be open or closed, thereby allowing or preventing light from passing through window 652. Apertures $654_0$-$654_{15}$ can represent a binary number. If a certain aperture is open, and light passes there through, then that aperture is represents a "1" bit. If a certain aperture is closed, and light does not pass there through, then that aperture represents a "0" bit. The represented binary number can be transformed into a number in any base (e.g., a decimal number or a hexadecimal number), in a conventional manner. For example, if apertures $654_0$ and $654_3$ are open, and the rest of the apertures are closed, then the binary number represented by the apertures is: "1001". The transformation of this binary number into a decimal number would be: $2^0+2^3=9$. That is, target ID matrix 650 represents the number nine. In this case, the target (or the specific location on a target) on which target ID matrix 650 is mounted, is identified by the number nine. When window 652 is divided by sixteen square apertures, it can represent $2^{16}$ (65,536) binary numbers. It is noted, that orientation mark 656 can be omitted, when apertures $654_{12}$-$654_{15}$, at the lower row of apertures of window 652, are closed and painted with a color detectable by the image detector. The lower row of apertures of window 652 thereby marks the bottom of target ID matrix 650, instead of orientation mark 656. In such a case, window 652 can represent binary numbers using the remaining twelve square apertures, which can represent $2^{12}$ (4,096) binary numbers.

It is noted, that light source 658 can include a plurality of LEDs, separately located behind each aperture of window 652. In this case, the respective LED emits light in order to mark an open aperture, the light passing only through the respective aperture. The respective LED emits no light to mark a closed aperture, such that this aperture appears dark. If a certain LED is malfunctioned, it can emit no light when it is supposed to emit light. The respective aperture may then appear dark when it is supposed to appear lit. Such cases may lead to mistakes in identification of target platforms, and the like. In order to avoid such mistakes, target ID matrix 650 can include an error detector (not shown) to detect a malfunction of the LEDs. For example, the error detector can be an internal light detector behind each aperture of window 652, for detecting light emitted by the respective LED, or a current detector, for detecting the current, passing through the respective LED. If the error detector determines that a certain LED is malfunctioned, it can produce a notification to the target, respective of target ID matrix 650. Alternatively, to avoid a case where an aperture is darkened due to LED failure, a plurality of LEDs can be located behind each aperture. Thus, if one LED is malfunctioned, other LEDs can emit light and mark that aperture as open. Additionally, the internal light detector behind the apertures of window 652 can indicate if light is reflected back from window 652 (i.e., if window 652 is obscured, covered, and the like).

The square frame of window 652 defines a two-dimensional local coordinate system, having a horizontal axis, designated X, coinciding with the horizontal bottom side of window 652. A vertical axis of this local coordinate system, designated Y, coincides with the vertical left side of window 652. In FIG. 14B, axes X and Y are depicted in dotted arrows, extending along the bottom side and the left side of window 652, respectively. A plurality of target ID matrices, such as target ID matrix 650, can be mounted on a target, participating in the combat training session. These target ID matrices can be mounted on different locations of the target (e.g., helmet, shoulders, chest, abdomen, and the like), each matrix defining a separate local coordinate system.

A shooter, operating a target acquisition apparatus, activates the weapon, with which the target acquisition apparatus is coupled, after pointing the weapon toward the target, on which target ID matrix 650 is mounted. The shooter thereby simulates a shot at that target, as the image detector of the target acquisition apparatus detects an image of target ID matrix 650. It is noted, that light source 658 may be inoperative and not emit any light, when appropriate lighting and visibility conditions are present (e.g., during the day time). In this case, the apertures of window 652 are visibly detectable by the image detector, and no additional illumination is required. Additionally, the open apertures of window 652 may be coated with a light-reflective material, thereby further allowing the detection thereof by the image detector. When lighting and visibility conditions are insufficient for the image detector to detect target ID matrix 650 (e.g., darkness, smoke or fog), light source 658 is operative to emit light. The light passes through the open apertures of window 652, and is detected by the image detector, despite the poor visibility conditions. Target ID matrix 650 may also include a light level sensor (not shown), for determining whether the lighting and visibility conditions are sufficient or insufficient for target ID matrix 650 to reflect enough incident light for the image detector to detect target ID matrix 650, when light source 658 is inoperative. The light level sensor is coupled with light source 658. The light level sensor can automatically activate or deactivate light source 658, according to the surrounding lighting conditions. When appropriate lighting and visibility conditions are present, light source 658 is inoperative, in order to save energy. Alternatively, the light level sensor can automatically adjust the light emission of light source 658, according to the lighting and visibility conditions.

The processor coupled with that image detector processes the acquired image, to identify the target, according to the binary number represented by apertures $654_0$-$654_{15}$. The processor also identifies the local coordinate system, defined by target ID matrix 650, by identifying the frame of window 652 as well as orientation mark 656 in the acquired image. Once the weapon processor has identified the local coordinate system, it can determine a simulated viability status of the target, due to the simulated shot, and perform further actions, as described herein above with reference to FIGS. 1-11. It is noted, that according to the example set forth in FIGS. 14A and 14B, since light source 658 emits light, which is not modulated, the target acquisition apparatus can operate using only an image detector, while a modulated light detector is not essential and can be omitted. It is further noted, that the light source of the target ID matrix can include a plurality of light sources, for illuminating each aperture separately. The target ID matrix can then be 'color-encoded', namely, by allocating specific wavelengths or wavebands to each aperture, the matrix can be encoded by either a binary basis or a higher basis field in which a specific value attributes each wavelength or waveband. Such color-encoding is applicable mainly in good lighting and visibility conditions. When the surrounding lighting conditions are poor, marking a target with a color-encoded matrix may visually draw the attention of other shooters participating in the combat training session.

Alternatively, the light emitter assembly of a target of the combat training session can be in the form of a small screen (e.g., CRT, LCD, TFT, and the like). The screen can be mounted on the target body at various locations, for example, on the abdomen of a participating soldier. The screen can display an image representing the identity of the respective target. For example, the screen can display a combination of symbols (e.g., letters, numbers, icons and combinations thereof) representing the identity of that target. Alternatively, the screen can display a representation of the target ID matrix, as described herein above, providing a spatial encoding respective of the target identity. When a screen is used as the light emitter assembly of the target, spatial encoding is provided to that target, which can be identified in an acquired image of that target.

Figure 15:
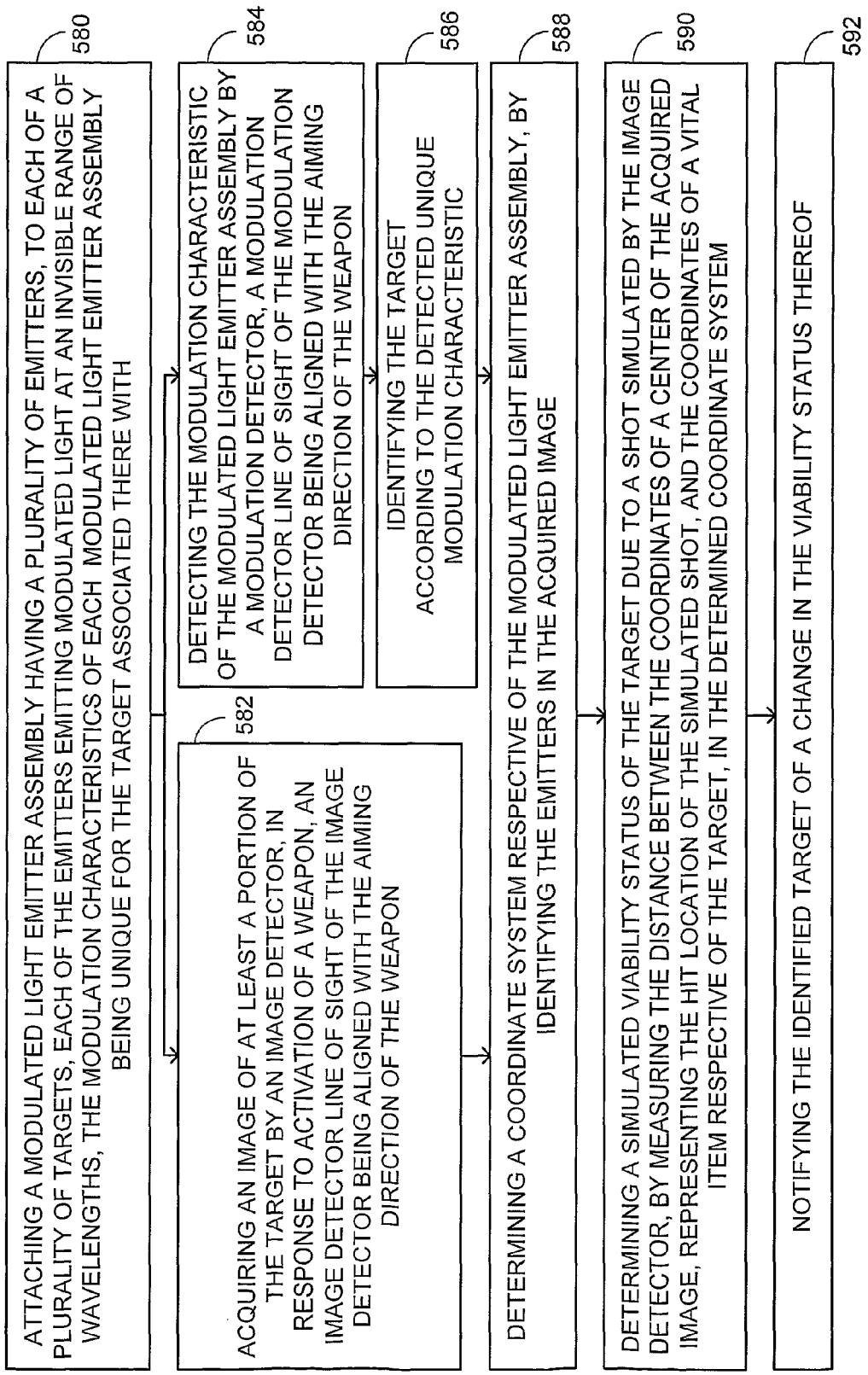
FIG. 15 is a schematic illustration of a method for operating the combat training system of FIG. 1, operative according to a further embodiment of the disclosed technique.

Reference is now made to FIG. 15, which is a schematic illustration of a method for operating the combat training system of FIG. 1, operative according to a further embodiment of the disclosed technique. In procedure 580, a modulated light emitter assembly having a plurality of emitters is attached to each of a plurality of targets, each of the emitters emitting modulated light at an invisible range of wavelengths, the modulation characteristics of each modulated light emitter assembly being unique for the target associated therewith. It is noted, that the modulated light emitter assembly can include a minimum of three emitters, defining a two-dimensional coordinate system (as described herein above with reference to FIGS. 1-12B), or two emitters, defining a directional vector (as described herein above with reference to FIGS. 13A and 13B).

With reference to FIGS. 1 and 2A, modulated light emitter assembly 118A which includes emitters 136A, 138A, and 140A is attached to the body of target 170. Each of emitters 136A, 138A, and 140A emits light at an invisible range of wavelengths (e.g., infrared or ultraviolet). Emitters 136A, 138A, and 140A are attached to the head, the right shoulder, and to the left shoulder of the body of target 170, respectively. Modulation controller 134A modulates the emission of the light emitted by emitters 136A, 138A, and 140A, at a blinking frequency of 2000 Hz (or according to a blinking pattern representing a code 2000).

In procedure 582, an image of at least a portion of the target is acquired by an image detector, in response to activation of a weapon, an image detector line of sight of the image detector being aligned with the aiming direction of the weapon. With reference to FIGS. 1 and 2A, when the shooter activates the weapon to attempt a shot at target 170, image detector 128 acquires an image from target 170. The line of sight of image detector 128 is aligned with the aiming direction of the weapon.

In procedure 584, a modulated light detector detects the modulation characteristic of the modulated light emitter assembly, a modulated light detector line of sight of the modulated light detector being aligned with the aiming direction of the weapon. With reference to FIGS. 1 and 2A, modulated light detector 130 detects the modulation characteristic of the modulated light emitted by emitters 136A, 138A, and 140A, in response to activation of the weapon.

It is noted, that if the modulated light detector is formed of a matrix of modulation detecting elements, it can detect a modulation image of at least a portion of the target, the modulation image including representations of the light emitters. In this case, procedure 582 is optional, and the method depicted in FIG. 13 can be performed without performing procedure 582. The modulation image detected by the modulation detector in procedure 584, can then replace the image detected by the image detector in procedure 582. With reference to FIGS. 1, 2A and 12A, modulated light detector 130 is formed of a matrix of modulation detecting elements. When the shooter simulates a shot using the associated weapon, weapon activation sensor 132 produces a triggering signal to activate modulation detector 130 to detect light emitted by each of emitters 136A, 138A and 140A. Modulation image 600 includes a representation of emitters 136A, 138A and 140A, designated by dots 602, 604 and 606, respectively.

In procedure 586, the target is identified according to the detected unique modulation characteristic. With reference to FIGS. 1 and 2A, weapon processor 126 identifies target 170, according to the output of modulated light detector 130 (i.e., according to the blinking frequency of emitters 136A, 138A, and 140A at 2000 Hz, or the blinking pattern representing a code 2000).

In procedure 588, a local coordinate system respective of the modulated light emitter assembly is determined, by identifying the emitters in the acquired image. When the light emitter assembly includes two emitters, the directional vector defined by the light emitters is determined, by identifying the emitters in the acquired image. With reference to FIGS. 1, 2B and 2C, weapon processor 126 identifies emitters 136A, 138A and 140A in image 198, and determines coordinate system 190 associated with emitters 136A, 138A, and 140A.

In procedure 590, a simulated viability status of the target due to a shot simulated by the image detector, is determined, by measuring the distance between the coordinates of a calibrated center of the acquired image (which can coincide with the center of the image detector), representing the hit location of the simulated shot, and the coordinates of a viable item respective of the target, in the determined local coordinate system. With reference to FIGS. 1, 2A, 2B and 2C, weapon processor 126 determines the value of the distance $d_1$ between the coordinates of center 200 of image 198, and the coordinates of cross 194 in image 198, in coordinate system 190. Center 200 represents the hit location of the shot which the shooter attempted at target 170, in coordinate system 190. Cross 194 represents the location of a viable organ of the body of target 170 (e.g., the heart), in coordinate system 190. Weapon processor 126 determines the viability status of target 170, by determining whether the value of the distance $d_1$, measured from cross 194, is equal to, or more or less than the radius r of hit region 196 (i.e., whether the shot would hit viable organ or not, or whether the shot would hit target 170 at all). It is noted, that when the light emitter assembly includes three emitters, the accuracy of determining the viability status of the target is improved, compared to a configuration where the light emitter assembly includes two emitters.

In procedure 592, the target is notified of a change in the viability status thereof. With reference to FIGS. 1 and 2A, when weapon processor 126 determines that target 170 is hit, weapon processor 126 produces a hit indication representing the respective viability status data. Weapon transceiver 124 transmits the hit indication (i.e., the viability status data respective of target 170), to receiver 116A. Modulation controller 134A modifies the modulation characteristic of the emission of light emitted by emitters 136B, 138B and 140B, according to this hit indication.

For example, if weapon processor 126 determines that target 170 is considered dead, as a result of the simulated shot, then modulation controller 134A directs emitters 136A, 138A and 140A, to change the blinking frequency thereof from 2000 Hz to 2030 Hz (or change the code represented by the blinking pattern from 2000 to 2030). If weapon processor 126 determines that target 170 is slightly injured, then modulation controller 134A directs emitters 136A, 138A and 140A, to change the blinking frequency thereof from 2000 Hz to 2020 Hz (or change the code represented by the blinking pattern from 2000 to 2020). Furthermore, notification module 122A produces a visual indication or an audio indication according to the viability status data, to notify the participating shooters of the viability status of target 170.

It is noted, that the method depicted in FIG. 15 may further include the procedure of determining the range between the weapon and the target, according to a separation of representations of a pair of the light emitters (relative to a third representation of a third emitter), according to the identification of the light emitters in the acquired image. It is noted, that this procedure can provide accurate results, only when the light emitter assembly includes at least three emitters. If the light emitter assembly includes only two light emitters, defining a directional vector, the range between the weapon and the target cannot be determined by the separation between the representations of the two light emitters. For example, if the target is rotated or inclined with respect to the target acquisition apparatus, the separation between the representations of the two light emitters may change in an unknown manner, rendering the range determination inaccurate.

It is further noted, that the method depicted in FIG. 15 may further include the procedure of determining the orientation of the target, according to a separation of representations of a pair of the light emitters (relative to a third representation of a third emitter), according to the identification of the light emitters in the acquired image. It is noted, that this procedure can be performed, only when the light emitter assembly includes at least three emitters. If the light emitter assembly includes only two light emitters, and the target is rotated or inclined with respect to the target acquisition apparatus, the separation between the representations of the two light emitters may change in an unknown manner, rendering the orientation determination inaccurate.

It will be appreciated by persons skilled in the art that the disclosed technique is not limited to what has been particularly shown and described hereinabove. Rather the scope of the disclosed technique is defined only by the claims, which follow.

The invention claimed is:

1. A target acquisition apparatus, for use in association with a moving target, the moving target including a modulated light emitter assembly, the modulated light emitter assembly including a plurality of light emitters arranged in a predetermined spatial configuration and emitting invisible light radiation and modulated according to a predetermined modulation characteristic, the modulation characteristic being unique for the moving target, said target acquisition apparatus comprising:

a weapon activation sensor, to be coupled with a weapon, for detecting activation of said weapon and producing a triggering signal;

an image detector, for acquiring an image of at least a portion of said moving target, in response to said triggering signal, a line of sight of said image detector being aligned with an aiming direction of said weapon;

a modulated light detector, for detecting said light radiation, the modulated light detector line of sight of said modulated light detector being aligned with the aiming direction of said weapon;

a weapon processor, coupled with said weapon activation sensor, said image detector and said modulated light detector, said weapon processor identifying said predetermined modulation characteristic from said detected light radiation, identifying said predetermined spatial configuration within a predetermined portion of said acquired image, determining a local coordinate system defined by said light emitters, and producing a hit indication in response to coinciding occurrence of said predetermined modulation characteristic identification and said predetermined spatial configuration identification; and a weapon transceiver, coupled with said weapon processor, for transmitting said hit indication.

2. A target acquisition apparatus according to claim 1, wherein said weapon processor identifies said moving target according to said predetermined modulation characteristic, and wherein said weapon transceiver transmits said hit indication to said moving target.

3. A target acquisition apparatus according to claim 2, further comprising a database, coupled with said weapon processor, including target identities and their respective predetermined modulation characteristic, wherein said processor identifies said moving target by extracting the target identity from said database, respective of said detected predetermined modulation characteristic.

4. A target acquisition apparatus according to claim 1, further comprising a first optical assembly, coupled with said modulated light detector, for focusing light rays from a predetermined field of view onto said modulated light detector.

5. A target acquisition apparatus according to claim 4, further comprising a second optical assembly, coupled with said image detector, for focusing the light rays from a predetermined field of view onto said image detector.

6. A target acquisition apparatus according to claim 1, wherein said weapon processor determines a simulated viability status of said moving target by determining the distance between coordinates of a hit location of said weapon in said acquired image, and coordinates of a viable item of the moving target, said coordinates of said viable item determined in said local coordinate system defined by said light emitters.

7. A target acquisition apparatus according to claim 6, wherein said hit indication represents said simulated viability status of said moving target.

8. A target acquisition apparatus according to claim 6, wherein said simulated viability status is selected from the list consisting of:
   slightly injured;
   severely injured; and
   incapacitated.

9. A target acquisition apparatus according to claim 6, further comprising a memory unit, for storing at least one selected from the list consisting of:
   at least one image acquired by said image detector;
   identity of the target;
   simulated viability status of the target; and
   detection time of each of said at least one acquired image.

10. A target acquisition apparatus according to claim 1, wherein said modulated light detector comprises a matrix of modulated light detecting elements, each of said detecting elements detecting modulated light impinging thereon.

11. A target acquisition apparatus according to claim 1, wherein said image detector comprises a charge coupled device (CCD) camera, detecting light at invisible wavelengths.

12. A target acquisition apparatus according to claim 1, wherein said image detector comprises a complementary metal-oxide semiconductor (CMOS) camera, detecting light at invisible wavelengths.

13. A target acquisition apparatus according to claim 1, wherein said plurality of light emitters includes at least three light emitters, said weapon processor determines a range between said weapon and said moving target, according to a separation of representations of a pair of said light emitters, relative to a third representation of a third light emitter, and according to said predetermined spatial configuration identification.

14. A target acquisition apparatus according to claim 1, wherein said plurality of light emitters includes at least three light emitters, said weapon processor determines an orientation of said moving target, according to a separation of representations of a pair of said light emitters relative to a third representation of a third light emitter, and according to said predetermined spatial configuration identification.

15. A target acquisition apparatus according to claim 1, wherein said image detector includes a wide field of view (FOV) section and a narrow FOV section, said wide FOV section being mainly focused on objects located at substantially short ranges from said weapon, said narrow FOV section being mainly focused on objects located at substantially long ranges from said weapon.

16. A target acquisition apparatus according to claim 1, wherein said weapon transceiver transmits an activation signal for activation of said light emitters in response to said triggering signal, said weapon transceiver transmits a deactivation signal for deactivation of said light emitters.

17. A target acquisition apparatus, for use in association with a moving target, the moving target including a modulated light emitter assembly, the modulated light emitter assembly including a plurality of light emitters arranged in a predetermined spatial configuration and emitting invisible light radiation modulated according to a predetermined modulation characteristic, the modulation characteristic being unique for the moving target, said target acquisition apparatus comprising:
   a weapon activation sensor, to be coupled with a weapon, for detecting activation of said weapon and producing a triggering signal;
   a modulated light detector, for acquiring a modulation image of at least a portion of said modulated light emitter assembly, in response to said triggering signal, a line of sight of said modulated light detector being aligned with an aiming direction of said weapon;
   a weapon processor, coupled with said weapon activation sensor and said modulated light detector, for identifying said predetermined modulation characteristic from said detected light radiation, identifying said predetermined spatial configuration within a predetermined portion of said acquired modulation image, determining a local coordinate system defined by said light emitters, and producing a hit indication in response to coinciding occurrence of said predetermined modulation characteristic identification and said predetermined spatial configuration identification; and
   a weapon transceiver, coupled with said weapon processor, for transmitting said hit indication.

18. A target acquisition apparatus according to claim 17, wherein said weapon processor identifies said moving target according to said predetermined modulation characteristic, and wherein said weapon transceiver transmits said hit indication to said moving target.

19. A target acquisition apparatus according to claim 18, further comprising a database, coupled with said weapon processor, including a plurality of target identities and their respective predetermined modulation characteristic, wherein said processor identifies said moving target by extracting one of the target identities from said database, respective of said detected predetermined modulation characteristic.

20. A target acquisition apparatus according to claim 17, further comprising an optical assembly, coupled with said modulated light detector, for focusing light rays from a predetermined field of view onto said modulated light detector.

21. The target acquisition apparatus according to claim 20, further comprising a second optical assembly coupled with said modulated light detector.

22. A target acquisition apparatus according to claim 17, wherein said weapon processor determines a simulated viability status of said moving target by determining a distance between coordinates of a hit location of said weapon in said acquired image, and coordinates of a viable item of the moving target, said coordinates of said viable item determined in said local coordinate system defined by said light emitters.

23. A target acquisition apparatus according to claim 22, wherein said hit indication represents said simulated viability status of said moving target.

24. A target acquisition apparatus according to claim 22, wherein said simulated viability status is selected from the list consisting of:
slightly injured;
severely injured; and
incapacitated.

25. A target acquisition apparatus according to claim 22, further comprising a memory unit, for storing at least one selected from the list consisting of:
at least one image acquired by said modulated light detector;
identity of the moving target;
simulated viability status of the moving target; and
detection time of each of said at least one acquired image.

26. A target acquisition apparatus according to claim 17, wherein said modulated light detector comprises a matrix of modulated light detecting elements, each of said detecting elements detecting modulated light impinging thereon.

27. A combat training system, comprising:
at least one moving target platform, including:
a receiver;
at least one modulated light emitter assembly, including:
a plurality of light emitters arranged in a predetermined spatial configuration and emitting invisible light radiation, said light emitters defining a local coordinate system; and
a modulation controller, coupled with said at least one modulated light emitter assembly and said receiver, for setting a modulation of the light emission of said light emitters according to a predetermined modulation characteristic, said modulation characteristic being unique for said moving target platform;
at least one target acquisition apparatus, including:
a weapon activation sensor, to be coupled with a weapon, for detecting activation of said weapon and producing a triggering signal;
an image detector, for acquiring an image of at least a portion of said moving target platform, in response to said triggering signal, a line of sight of said image detector being aligned with an aiming direction of said weapon;
a modulated light detector, for detecting said light radiation, a line of sight of said modulated light detector being aligned with the aiming direction of said weapon;
a weapon processor, coupled with said weapon activation sensor, said image detector and said modulated light detector, identifying said predetermined modulation characteristic from said detected light radiation, identifying said predetermined spatial configuration within a predetermined portion of said acquired image, determining a local coordinate system defined by said light emitters and producing a hit indication in response to coinciding occurrence of said predetermined modulation characteristic identification and said predetermined spatial configuration identification; and
a weapon transceiver, coupled with said weapon processor, for transmitting said hit indication; and
a training controller, including:

a main transceiver, for communicating with said non virtual moving target platform and said target acquisition apparatus;
a database, for storing at least one selected from the list consisting of: images acquired by said image detector, identities of at least one moving target, a simulated viability status of said at least one moving target, and detection time of each of said acquired images; and
a main processor, coupled with said main transceiver and said database.

28. A combat training system according to claim 27, wherein said weapon processor identifies said target platform according to said predetermined modulation characteristic, said weapon transceiver transmitting said hit indication to said receiver of said target platform.

29. A combat training system according to claim 27, wherein said weapon transceiver transmits said hit indication to said training controller, said main processor identifying said moving target platform according to said predetermined modulation characteristic, said main transceiver transmitting said hit indication to said receiver of said moving target platform.

30. A combat training system according to claim 27, wherein said weapon processor determines a simulated viability status of a moving target associated with said moving target platform, by determining the distance between coordinates of a hit location of said weapon, and coordinates of a viable item of a moving target associated with said moving target platform, said coordinates of said viable item determined in said local coordinate system.

31. A combat training system according to claim 27, wherein said weapon transceiver transmits said acquired image to said training controller, said main processor determining a simulated viability status of a moving target associated with said moving target platform, by determining a distance between coordinates of a hit location of said weapon, and coordinates of a viable item of the moving target, said coordinates of said viable item determined in said local coordinate system.

32. A combat training system, comprising:
at least one moving target platform, including:
a receiver;
at least one modulated light emitter assembly, including:
a plurality of light emitters arranged in a predetermined spatial configuration and emitting invisible light radiation, said light emitters defining a local coordinate system; and
a modulation controller, coupled with said at least one modulated light emitter assembly and said receiver, for setting a modulation of the light emission of said light emitters according to a predetermined modulation characteristic, said modulation characteristic being unique for said moving target platform;
at least one target acquisition apparatus, including:
a weapon activation sensor, to be coupled with a weapon, for detecting activation of said weapon and producing a triggering signal;
a modulated light detector, for acquiring a modulation image of at least a portion of said at least one modulated light emitter assembly, in response to said triggering signal, a line of sight of said modulated light detector being aligned with an aiming direction of said weapon;
a weapon processor, coupled with said weapon activation sensor and said modulated light detector, identifying said predetermined modulation characteristic from said detected light radiation, identifying said predetermined spatial configuration within a predetermined portion of said acquired modulation image, determining a local coordinate system defined by said light emitters and producing a hit indication in response to coinciding occurrence of said predetermined modulation characteristic identification and said predetermined spatial configuration identification; and a weapon transceiver, coupled with said weapon processor, for transmitting said hit indication; and a training controller, including:
a main transceiver, for communicating with said target platform and said target acquisition apparatus;
a database, for storing at least one selected from the list consisting of:
modulation images acquired by said modulated light detector, identities of said at least one moving target, a simulated viability status of at least one moving target, and detection time of each of said acquired modulation images; and
a main processor, coupled with said main transceiver and said database.

33. A combat training system according to claim 32, wherein said weapon processor identifies said moving target platform according to said predetermined modulation characteristic, said weapon transceiver transmitting said hit indication to said receiver of said moving target platform.

34. A combat training system according to claim 32, wherein said weapon transceiver transmits said hit indication to said training controller, said main processor identifying said moving target platform according to said predetermined modulation characteristic, said main transceiver transmitting said hit indication to said receiver of said moving target platform.

35. A combat training system according to claim 32, wherein said weapon processor determines a simulated viability status of a moving target associated with said moving target platform, by determining a distance between coordinates of a hit location of said weapon, and coordinates of a viable item of the moving target associated with said moving target platform, said coordinates of said viable item determined in said local coordinate system.

36. A combat training system according to claim 32, wherein said weapon transceiver transmits said acquired image to said training controller, said main processor determining a simulated viability status of a moving target associated with said moving target platform, by determining a distance between coordinates of a hit location of said weapon, and coordinates of a viable item of the moving target, the coordinates of said viable item determined in said local coordinate system.

37. A method for managing a simulated aimed combat, comprising the procedures of:
attaching at least one modulated light emitter assembly having a plurality of light emitters, to each of a plurality of moving targets, each of said light emitters emitting modulated invisible light, the modulation characteristic of each of said modulated light emitter assemblies being unique for a moving target associated therewith;
acquiring an image of at least a portion of said moving target by an image detector, in response to a weapon activation, a line of sight of said image detector being aligned with an aiming direction of said weapon;
detecting said modulation characteristic of said modulated light emitter assembly by a modulated light detector during said procedure of acquiring, a line of sight of said modulated light detector being aligned with said aiming direction of said weapon;
identifying said moving target according to said detected unique modulation characteristic;
determining a local coordinate system defined by said light emitters, by identifying said light emitters in said acquired image;
determining a simulated viability status of said moving target due to a shot simulated by said image detector, by determining a distance between a hit location of said simulated shot, and coordinates of a viable item of said moving target, in said determined local coordinate system; and
notifying said identified moving target of a change in the viability status thereof.

38. The method according to claim 37, further comprising the procedure of instructing said identified moving target to act according to said change in the viability status thereof.

39. The method according to claim 37, further comprising the procedure of storing at least one selected from the list consisting of: said acquired image, said respective target identity, and said respective viability status, for analyzing the results of said simulated armed combat.

40. The method according to claim 37, wherein said plurality of emitters includes at least three emitters, and further comprising the procedure of determining the range between said weapon and said target, according to a separation of representations of a pair of said light emitters, relative to a third representation of a third emitter, according to said identification of said light emitters in said acquired image.

41. The method according to claim 37, wherein said plurality of emitters includes at least three light emitters, and further comprising the procedure of determining the orientation of said moving target, according to a separation of representations of a pair of said light emitters, relative to a third representation of a third light emitter, according to said identification of said light emitters in said acquired image.

42. A method for managing a simulated armed combat, comprising the procedures of:
attaching at least one modulated light emitter assembly having a plurality light emitters, to each of a plurality of moving targets, each of said light emitters emitting modulated invisible light, the modulation characteristic of each of said modulated light emitter assemblies being unique for the moving target associated therewith;
acquiring a modulation image of at least a portion of said moving target by a modulated light detector, in response to a weapon activation, the modulated light detector line of sight of said modulated light detector being aligned with the aiming direction of said weapon;
detecting said modulation characteristic of said modulated light emitter assembly by said modulated light detector during said procedure of acquiring;
identifying said moving target according to said detected unique modulation characteristic;
determining a local coordinate system defined by said light emitters, by identifying said light emitters in said acquired modulation image;
determining a simulated viability status of said moving target due to a shot simulated by said modulated light detector, by determining a distance between a hit location of said simulated shot, and coordinates of a viable item of said moving target, in said determined local coordinate system; and
notifying said identified moving target of a change in the viability status thereof.

43. The method according to claim 42, further comprising the procedure of instructing said identified target to act according to said change in the viability status thereof.

44. The method according to claim 42, further comprising the procedure of storing at least one selected from the list consisting of said acquired image, said respective target identity, and said respective viability status, for analyzing the results of said simulated armed combat.

45. A target identification (ID) matrix, for coupling with a target platform, to be used in association with a target acquisition apparatus, the target acquisition apparatus including an image detector, the image detector acquiring an image of said target ID matrix, said target ID matrix comprising:
- a plurality of apertures arranged in a predetermined spatial configuration, each of said apertures being either open or closed, wherein said apertures represent a unique representation, respective of said moving target;
- an orientation mark, located at a predetermined location relative to said apertures, for marking the orientation of said target ID matrix;
- a light source, placed behind said apertures, for emitting light radiation detectable by said image detector, wherein said light passes through said apertures when said apertures are open, and said light is prevented from passing through said apertures when said apertures are closed; and
- a light level sensor coupled with said light source, for determining whether the lighting conditions around said moving target are sufficient for said target ID matrix to reflect enough incident light for image detector to detect said target ID matrix.

46. The target ID matrix according to claim 45, wherein said light level sensor automatically adjusts the light emission of said light source according to said lighting conditions.

47. The target ID matrix according to claim 46, wherein said light level sensor automatically activates said light source when said lighting conditions are insufficient, said light level sensor automatically deactivates said light source when said lighting conditions are sufficient.

* * * * *